US005440756A

United States Patent [19]

Larson

[11] Patent Number: 5,440,756

[45] Date of Patent: Aug. 8, 1995

[54] APPARATUS AND METHOD FOR REAL-TIME EXTRACTION AND DISPLAY OF MUSICAL CHORD SEQUENCES FROM AN AUDIO SIGNAL

[76] Inventor: Bruce E. Larson, HCR #63 Box 4, South Newfane, Vt. 05351

[21] Appl. No.: 951,397

[22] Filed: Sep. 28, 1992

[51] Int. Cl.$^6$ .......................... G06F 3/16; G06F 3/05; G06F 13/10

[52] U.S. Cl. ................................ 395/800; 364/221.4; 364/221.5; 364/229.5; 364/231.4; 364/232.91; 364/234.3; 364/237.9; 364/239; 364/239.7; 364/267.2; 364/267.4; 364/271.4; 364/DIG. 1; 364/DIG. 2; 84/635; 84/637; 84/631; 84/650

[58] Field of Search .............. 395/800, 250, 275, 375, 395/500, 550, 700, 325; 364/DIG. 1, DIG. 2, 484; 84/635, 637, 477 R, 454, 631, 650

[56] References Cited

U.S. PATENT DOCUMENTS 4,054,868 10/1977 Rose ................................ 84/470 R
4,546,690 10/1985 Tanaka et al. .................... 84/477 R
4,732,071 3/1988 Deutsch ................................ 84/454
5,056,401 10/1991 Yamaguchi et al. .................. 84/635
5,214,993 6/1993 Konishi ................................ 84/637

*Primary Examiner*—Alyssa H. Bowler
*Assistant Examiner*—Daniel H. Pan
*Attorney, Agent, or Firm*—Daniel Kim

[57] ABSTRACT

An apparatus and method are provided for processing an audio signal conveying a musical passage so as to reveal the sequence of musical chords contained within that passage. The signal is amplified, filtered, and converted to digital data, which are then processed using digital filters to determine in real time the amplitude of every note within a predetermined note range. The most prominent notes are compared to chord patterns to determine which, if any, chord is implied, and the chord name is then displayed to the user. Further provided is a means for detecting and correcting for any deviation of the pitches of the notes in the passage from their standard frequencies.

14 Claims, 13 Drawing Sheets

SIGNAL STRENGTH INDICATOR

INTONATION INDICATOR

PITCH ADJUSTER

NOTE VOLUME INDICATOR

CHORD TIMELINE

APPARATUS AND METHOD FOR REAL-TIME EXTRACTION AND DISPLAY OF MUSICAL CHORD SEQUENCES FROM AN AUDIO SIGNAL

DESCRIPTION

1. Field of the Invention

The present invention relates generally to the fields of microprocessor-based systems for analyzing analog signals, and in particular to microprocessor-based systems for analysis of music.

2. Background Art

It is desirable for a number of reasons for musicians to be able to analyze the progression of chords in a given musical passage. Traditionally, musicians have relied on their musical ear, developed through training and practice, to derive chords. However, ear training is inherently limited by the musician's innate ability.

The prior art provides devices and methods for analyzing acoustic signals. These include amplification and filtering of acoustic signals, both analog and digital, analog-to-digital conversion of acoustic signals, and microprocessor-based signal processing.

DISCLOSURE OF INVENTION

The present invention provides an electronic system for analyzing the chords present in a given musical passage. In a preferred embodiment, the system includes input means for receiving an analog signal, analog-to-digital conversion means for converting the analog signal into a digital signal, single-note filter means for determining the presence and relative volumes of individual notes within the digital signal, and computing means for determining what chords are characterized by the detected individual notes.

DETAILED DESCRIPTION OF SPECIFIC EMBODIMENTS

The present invention provides an electronic system for performing tonal analysis on passages of recorded music. Its primary function and purpose is to determine the sequence of chords that comprise a given musical passage.

In a preferred embodiment, the present invention includes (1) a software package that runs on a personal computer, such as an IBM-PC or compatible with a clock rate of at least 16 MHz and with a VGA card and monitor and (2) an external device that is connected to the personal computer through the computer's serial port. The external device receives as input a standard audio signal from a tape deck, compact disc player, or microphone. The output of the system is a graphic display of a timeline of chords on the PC's monitor. This chord timeline informs the user of the name, time, and duration of every chord that occurs in the musical sequence.

The present system provides especially accurate chord-sequence transcriptions on music that makes use of mid-range instruments and embodies a clear progression of chords. For example, songs with consistent guitar strums or strong vocal harmonies are excellent candidates for transcription. Music which is lacking harmonic content, or whose harmonic elements are exclusively high-range (above the pitch C5), do not lend themselves for ready transcription employing the present system.

The present system employs a chain of processes that converts a particular audio signal into a set of note volumes, which are then translated into chords and mapped onto a timeline. A note volume is the amplitude of a particular frequency component of the acoustic signal corresponding to a note on a 12-tone diatonic scale. A chord embodied in an acoustic signal will display a characteristic set of note volumes. In a preferred embodiment of the present invention, a range of four octaves, i.e., 48 notes, is used. However, it would of course be possible to expand the range Of note volumes, as desired.

Figure 1:
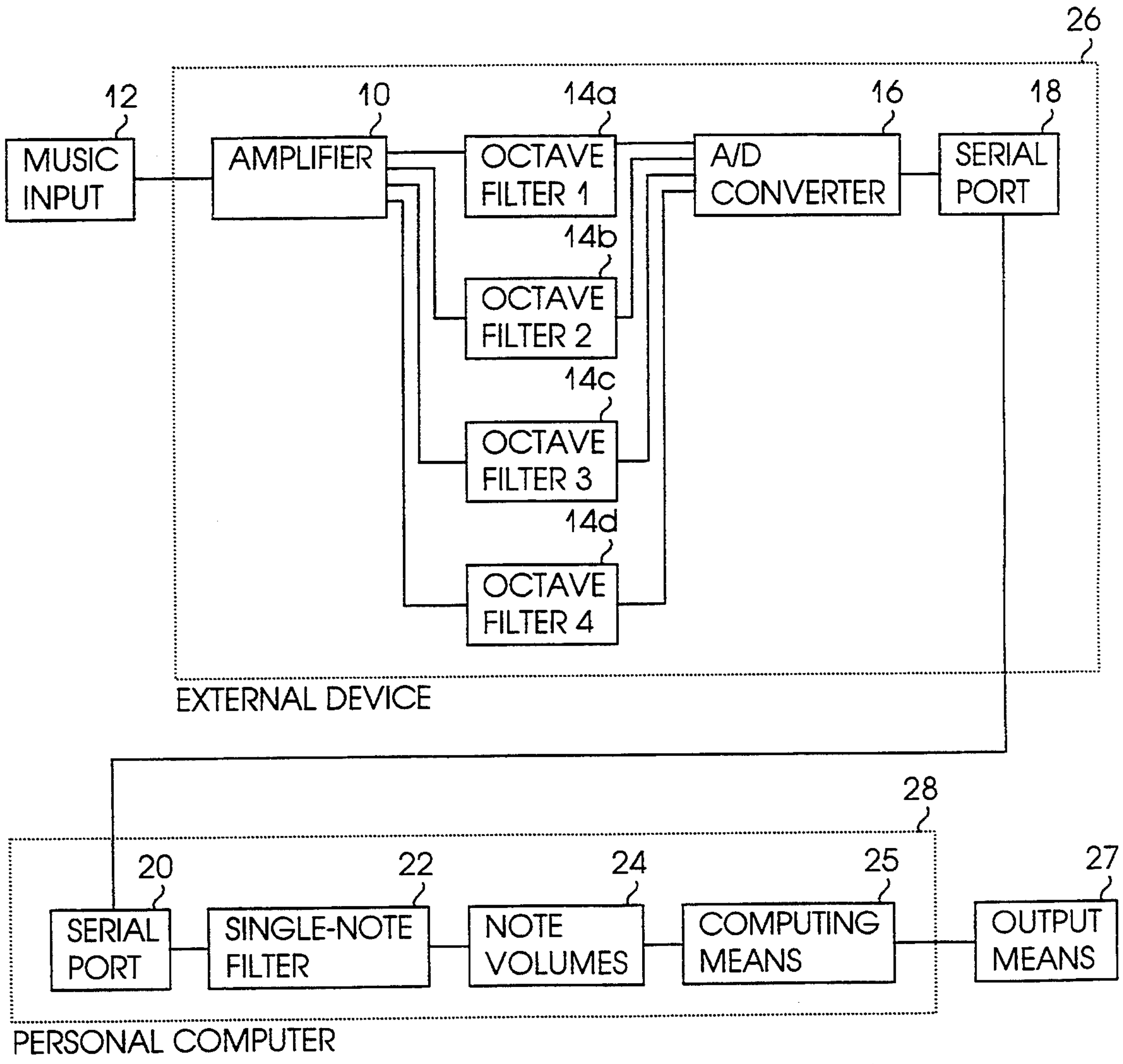
FIG. 1 is a block drawing of the components of a preferred embodiment of the present invention.

FIG. 1 is a block diagram of the steps in the chain. An amplifier 10 takes as its input 12 a pair of audio signals. It provides as an output the sum of the two signals multiplied by a gain that is controllable by the user.

In the present preferred embodiment, four octave filters 14*a–d* divide the amplified signal into four separate signals, each of which carries the frequencies belonging to a particular octave range. However, it is possible to implement an alternative embodiment of the present invention in which the signal is not divided into separate components, but digitized as a whole. In such a system, however, it is desirable, using means known in the art, for a low-pass filter to be provided in order to filter out aliasing frequencies. Further, in alternative embodiments, it would be possible to increase the number of filters to increase the range of the system.

An analog-to-digital converter 16 converts the four analog signals into four digital signals, which are multiplexed into a single digital signal for serial transmission. An external serial port 18 transmits the digital signal in a standard serial format to the PC. The PC serial port 20 receives the serial input and reconstructs the digital signal. A single-note filter 22 de-multiplexes the digital signal back into its four component signals. It then digitally filters each of those signals twelve times, each time isolating the frequency-band of a particular note. The note volumes 24 are then determined from the results of this filtering. The set of note volumes is then compared against a library of characteristic sets of note volumes to provide the final interpretation into chords which are then mapped against a timeline.

A preferred embodiment of the present invention includes an external device 26 and a personal computer 28 and is embodied partially in hardware and partially in software. In particular, the single-note filtering, final chord interpretation, and final output generation are performed using software. However, as would be obvious to a practitioner of ordinary skill in the art, it would be possible to alter this configuration is a number of ways without departing from the essence of the invention.

FIGS. 2A-E provide a detailed schematic of a preferred embodiment of the external device 26 shown in FIG. 1.

Figure 2A:
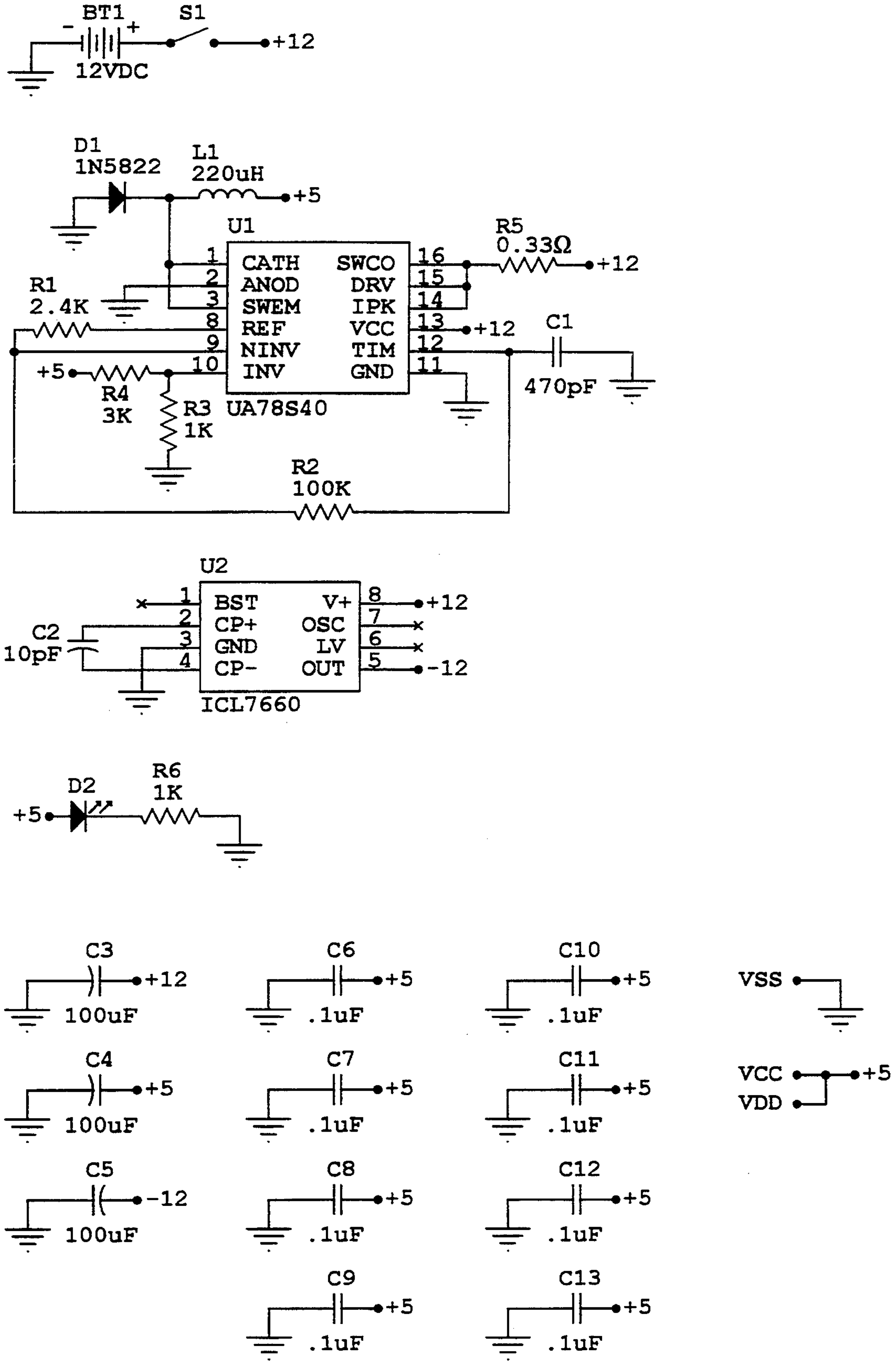
FIGS. 2A–E are schematic drawings of an external device according to a preferred embodiment of the present invention.
Figure 2B:
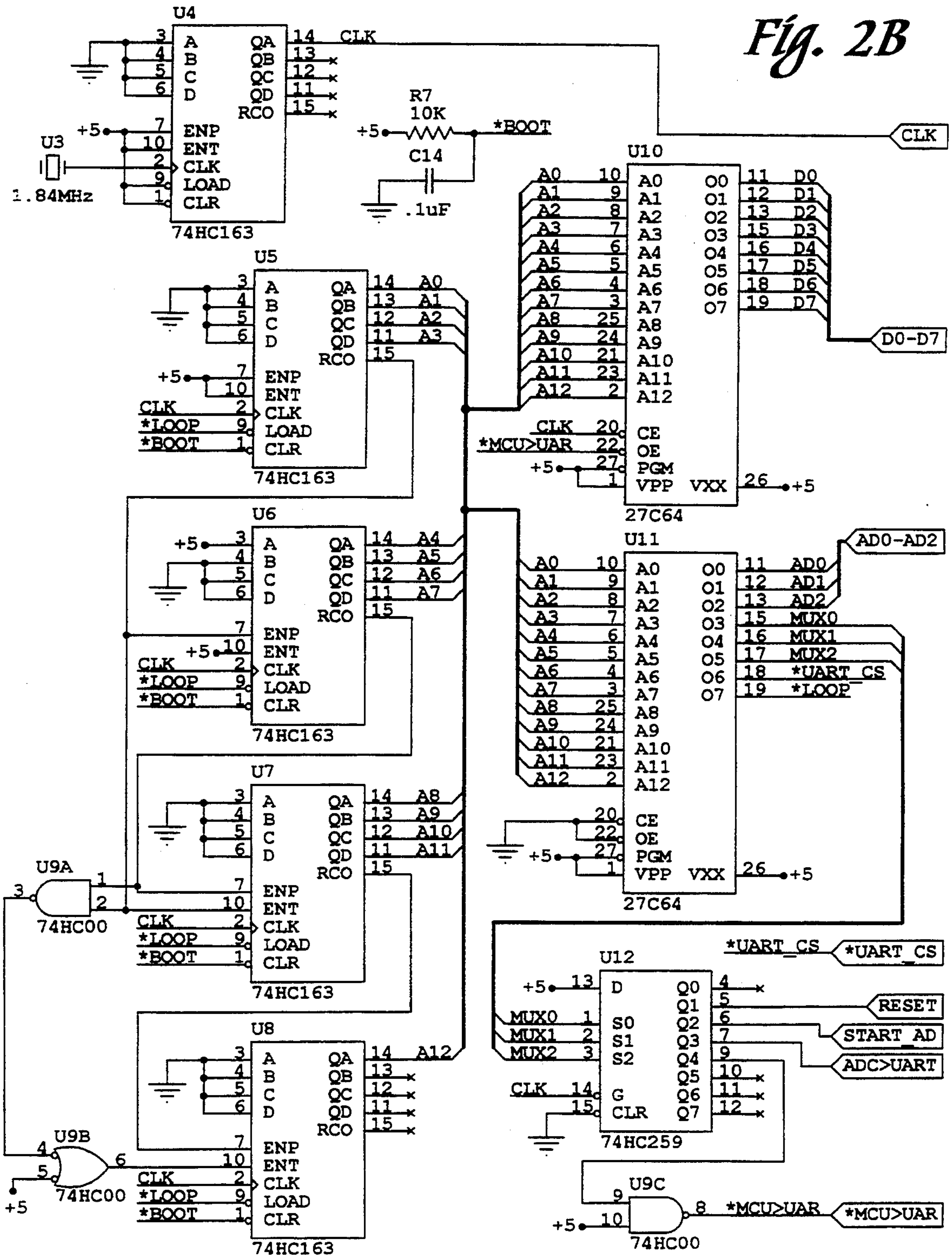
Figure 2C:
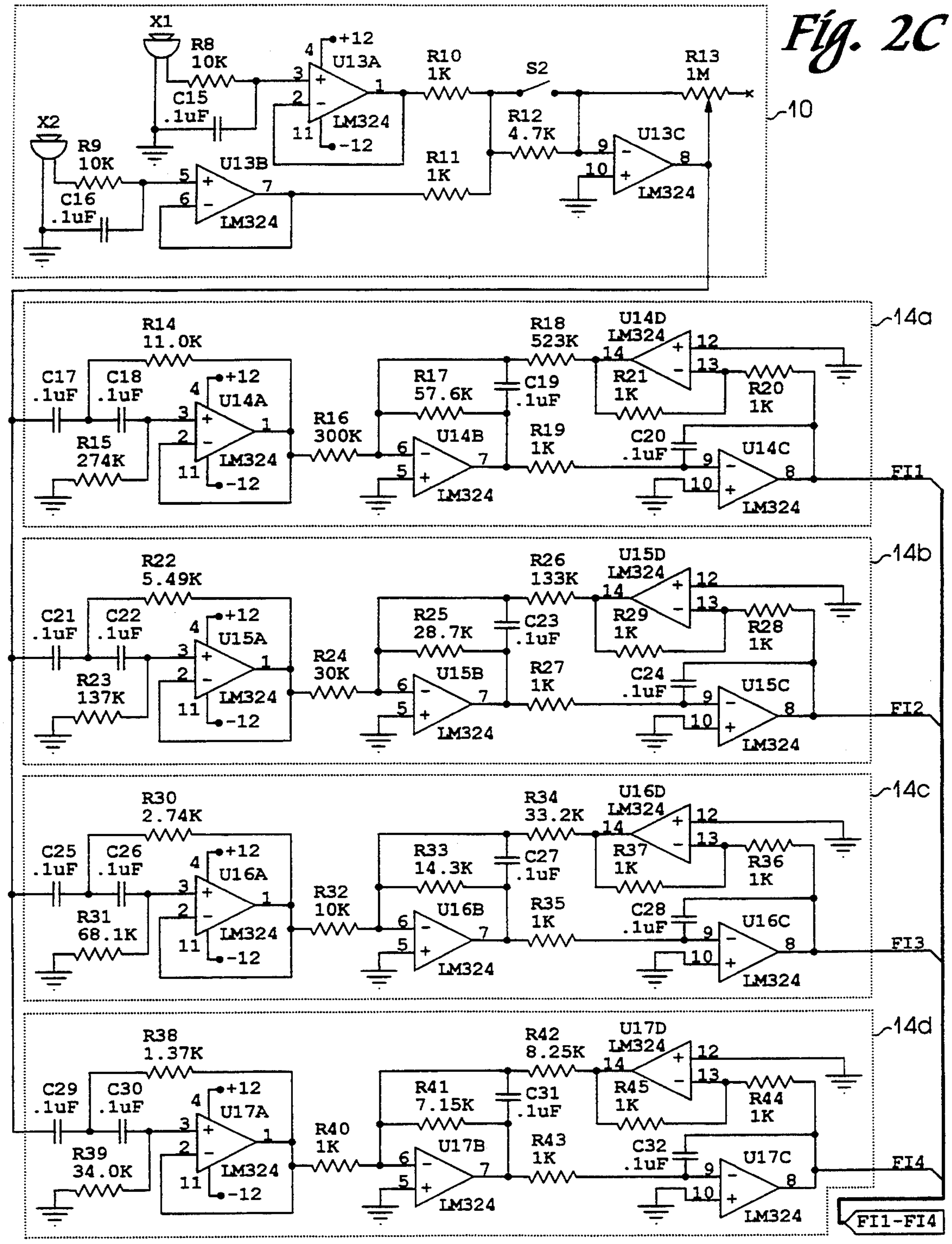

The amplifier 10 of FIG. 1 is provided in FIG. 2C by three LM 324 op-amps U13A, U13B, and U13C. Its inputs are two connectors X1 and X2 for receiving the stereo audio signal. The amplifier performs three functions between its inputs and its output: (1) it receives and stabilizes the two incoming audio signals; (2) it combines the two signals into one; and (3) it amplifies the combined signal by a gain controllable by the user.

The two audio input signals are stabilized by the resistor/capacitor combinations R8/C15 and R9/C16 attached to each microphone lead X1 and X2. The stabilized signals are added together using a voltage adder circuit U13A, U13B, R10, and R11. The combined signal is then amplified with an inverting amplifier U13C, R12, R13, and S2. The inverting amplifier incorporates a switch S2 and a potentiometer R13, both of which allow the gain of the circuit to be controlled by the user.

The four octave filters constitute the remainder of the circuitry shown in FIG. 2C. As is apparent from FIG. 2C, the octave filters receive as their input the stabilized, added, and amplified audio input signal, and their outputs are the four signals labelled "FI[1 . . . 4]".

The function of the octave filters is to separate the frequencies of the audio signal into four bands, each carrying frequencies that fall within a particular octave range. The first octave filter 14*a* isolates all frequencies between the pitches C1 and B1; the second octave filter 14*b*, the frequencies between C2 and B2; the third octave filter 14*c*, the frequencies between C3 and B3; and the fourth octave filter 14*d*, the frequencies between C4 and B4. These four octaves comprise the range over which the present preferred embodiment is capable of detecting notes.

This separation of frequencies is necessary and desirable for two reasons. The first reason is that lower frequencies generally tend to have much greater amplitudes than higher frequencies, and thus tend to dominate the signal. If the signal were to be digitized as a whole, the dominant lower frequencies would drown out the higher frequencies. By digitizing each octave range separately, the system allows both strong and weak frequencies to be digitized with equal resolution.

The second reason for the separation of frequencies is that the minimum sampling rate of higher frequencies is greater than that of lower frequencies. For example, in order for a signal carrying the pitch A4 to be accurately digitized, it must be sampled at a rate of at least 880 Hz. By contrast, a signal carrying the pitch A1 need only be sampled at a rate of 110 Hz. By isolating each of the octave ranges and sampling and processing it separately, the system can devote the most amount of processor time where it is most needed, i.e., on the higher octave ranges.

Figure 3:
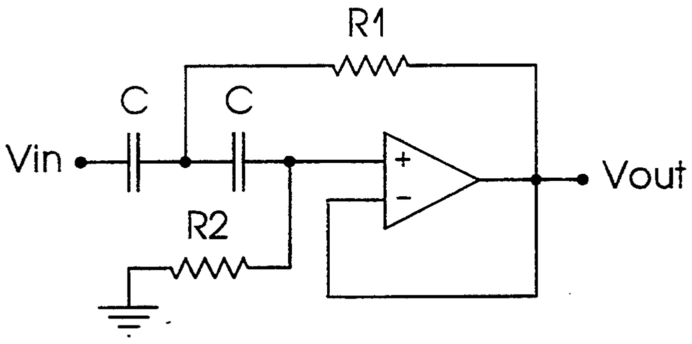
FIG. 3 is a schematic drawing of a high-pass filter used in a preferred embodiment of the present invention.

Each of the four octave filters is actually a pair of filters, a high-pass filter followed by a low-pass filter. The general circuit diagram for the high-pass filter used in the present preferred embodiment is shown in FIG. 3. The formulae used to calculate appropriate values for R1 and R2 are as follows:

$$R_1 = \frac{\mu}{2\pi f C}$$

$$R_2 = \frac{1}{2\pi f \mu C}$$

The circuit values for the high-pass component of the first octave filter 14*a* are determined in the following way. We choose a sharpness factor $\mu$ of 0.2 and a cutoff frequency f of 29.14 Hz. Note that this latter value is slightly below the C1 frequency of 32.70 Hz; this discrepancy makes an allowance for deviations in component values. Selecting a capacitor value C of 0.1 $\mu$F, we are able to determine the values of resistors R1 and R2. Solving the equations, we obtain R1=10.93K and R2=273.1K. Rounding these values to the nearest standard resistances, we assign R1=11.0K and R2=274K. These are the values used in the actual octave filter circuit 14*a*, where R14 and R15 correspond to resistors R1 and R2 in the general schematic.

For the remaining octave filters 14*b–d*, appropriate values for f are 58.27 Hz, 116.54 Hz, and 233.08 Hz, respectively, while $\mu$ and C are assigned the same values as for the first octave filter. The resistor values are then determined using the circuit equations as shown above.

Figure 4:
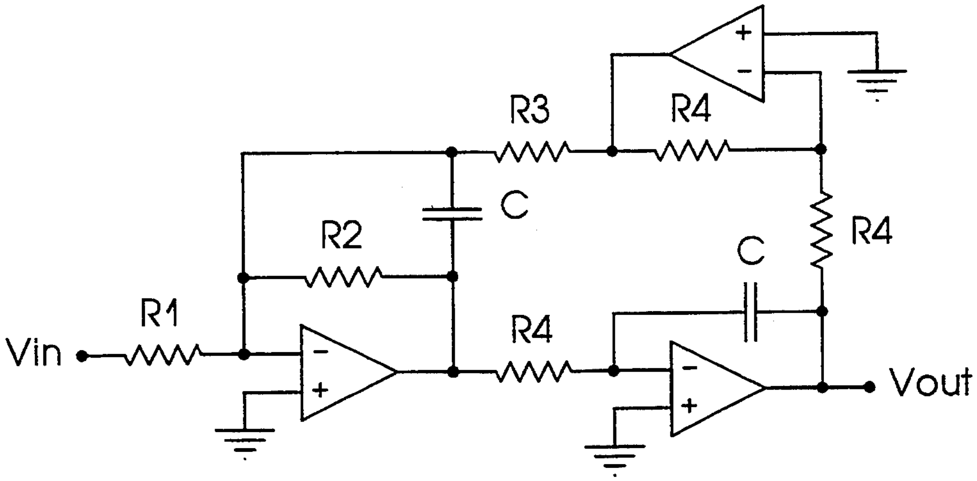
FIG. 4 is a schematic of a low-pass filter used in a preferred embodiment of the present invention.

The general circuit diagram for the low-pass filter used in the present preferred embodiment is shown in FIG. 4. The general formulae used to calculate appropriate values for R1, R2, and R3 are as follows:

$$R_3 = \frac{1}{4\pi^2 f^2 R_4 C^2}$$

$$R_2 = \frac{1}{4\pi f \mu C}$$

$$R_1 = \frac{R_3}{\text{GAIN}}$$

The circuit values for the low-pass component of the first octave filter 14*a* is determined in the following way. A sharpness factor $\mu$ of 0.2 has been found to be desirable. A cutoff frequency f of 69.30 Hz is used. Note that the value of f is slightly higher than the B1 value of 61.74 Hz, again to allow for deviations in component values. Selecting a C value of 0.1 $\mu$F and an R4 value of 1K, we are able to solve the equations for R2 and R3, and obtain R2=57.42K and R3=527.5K. These values approximate to R2=57.6K and R3=523K, which are the resistances used in the actual octave filter circuit R17 and R18. R1 controls the gain and is determined experimentally; a value of 300K works well and thus is used for R16 in the actual circuit.

In the remaining three octave filters 14*b–d*, the parameter f is assigned the frequencies 138.59 Hz, 277.18 Hz, and 554.37 Hz, respectively, while the parameters $\mu$, C, and R4 have the same values as before. The resistor values are then determined using the circuit equations as shown above.

Figure 2D:
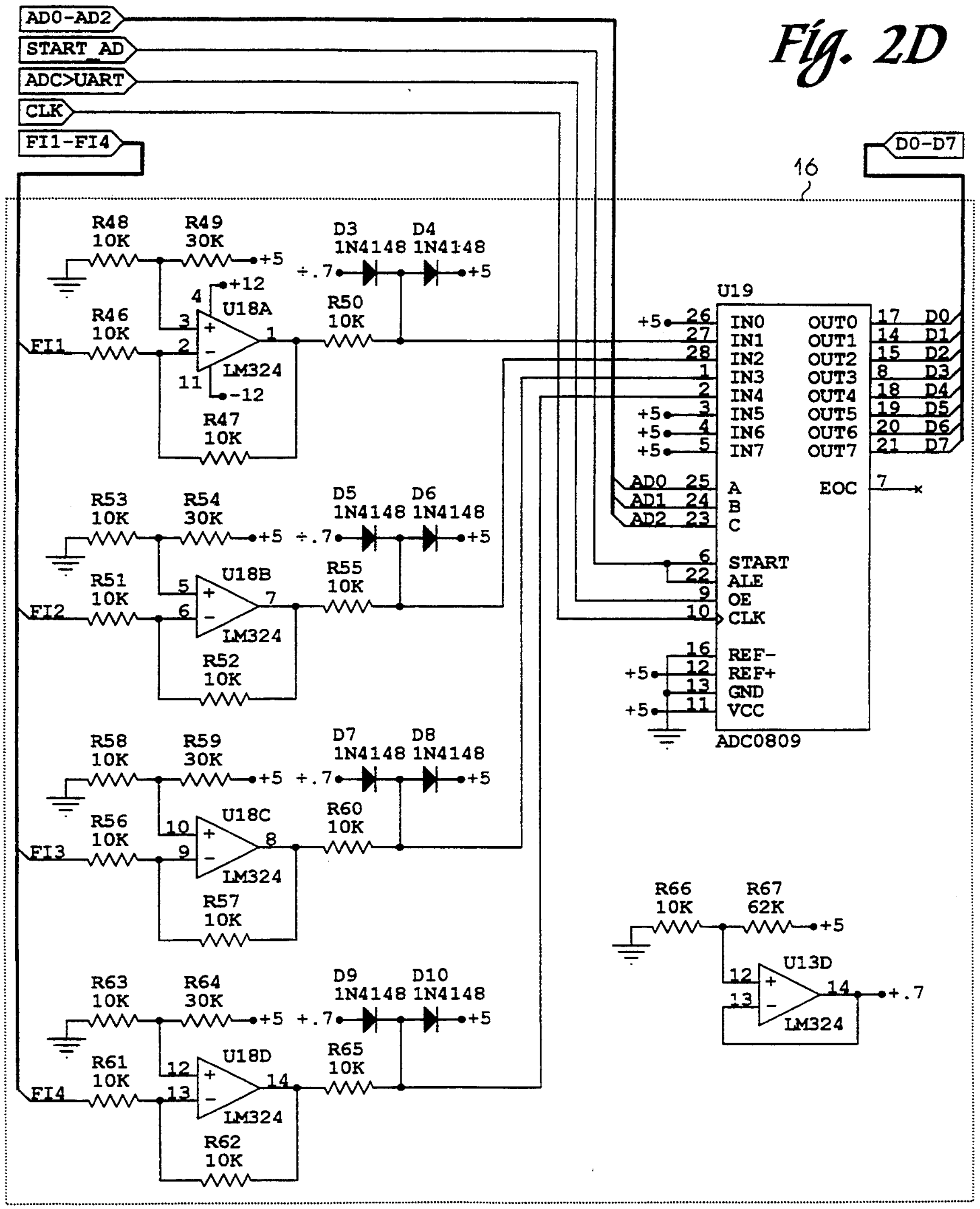

FIG. 2D shows a schematic drawing of the analog-to-digital converter 16 used in the present preferred embodiment. Its inputs are the four signals labelled "FI[1 . . . 4]" as well as control signals AD[0 . . . 2], START_AD, ADC>UART, and CLK from the microprogrammed control unit (MCU) depicted in FIG. 2B. The output of the FIG. 2D analog-to-digital converter is the eight-bit word D[0 . . . 7].

The overall function of the analog-to-digital converter is to convert the four analog signals received as an input from the four octave filters into a single multiplexed digital signal. The converter achieves this end by sampling each of the signals at regular intervals and converting each sample to an eight-bit number. The sampling interval is different for each octave; as mentioned before, the sampling rate of higher frequencies must be greater than that of lower frequencies. Octave range 1, corresponding to the output from the first octave filter, is sampled at a rate of 300 Hz; octave range 2, at a rate of 600 Hz; octave range 3 at a rate of 1200 Hz; and octave range 4 at a rate of 2400 Hz. The analog-to-digital converter performs a conversion every 4800 Hz, selecting a different octave range each time. It selects the octave ranges in the following pattern, which repeats continuously:

4, 3, 4, 2, 4, 3, 4, 1, 4, 3, 4, 2, 4, 3, 4, X

The above pattern realizes the aforementioned sampling rates for each octave range. The "X" indicates that no octave range is selected on the 16th step; the analog-to-digital converter is idle during that time. On the 16th step, the byte 00000000 is sent to the serial port by the MCU. This zero-byte is a message to the PC that the octave range selection pattern is about to repeat again. By sending this end-of-pattern message, the external device is able to remain synchronized with the PC.

Each of the "FI[1 . . . 4]" signals is centered about the zero-volt axis as it enters the analog-to-digital converter. Because the converter expects its input to be between zero and five volts, the signals must be re-centered about the 2.5-volt axis and limited to the zero-to-five-volt range. The re-centering of each signal is accomplished with four inverting amplifier circuits (U18-A–D). The voltage limitation is achieved with a pair of diodes (D3–D10) following each inverting amplifier. Note that the lower voltage limit is actually 0.1 volts rather than 0 volts; this provision exists so that the signals are never digitized to zero; zero is reserved for the end-of-pattern message mentioned above. The four signals are then digitized in the aforementioned pattern by an ADC0809 analog-to-digital converter integrated circuit (U19).

Figure 2E:
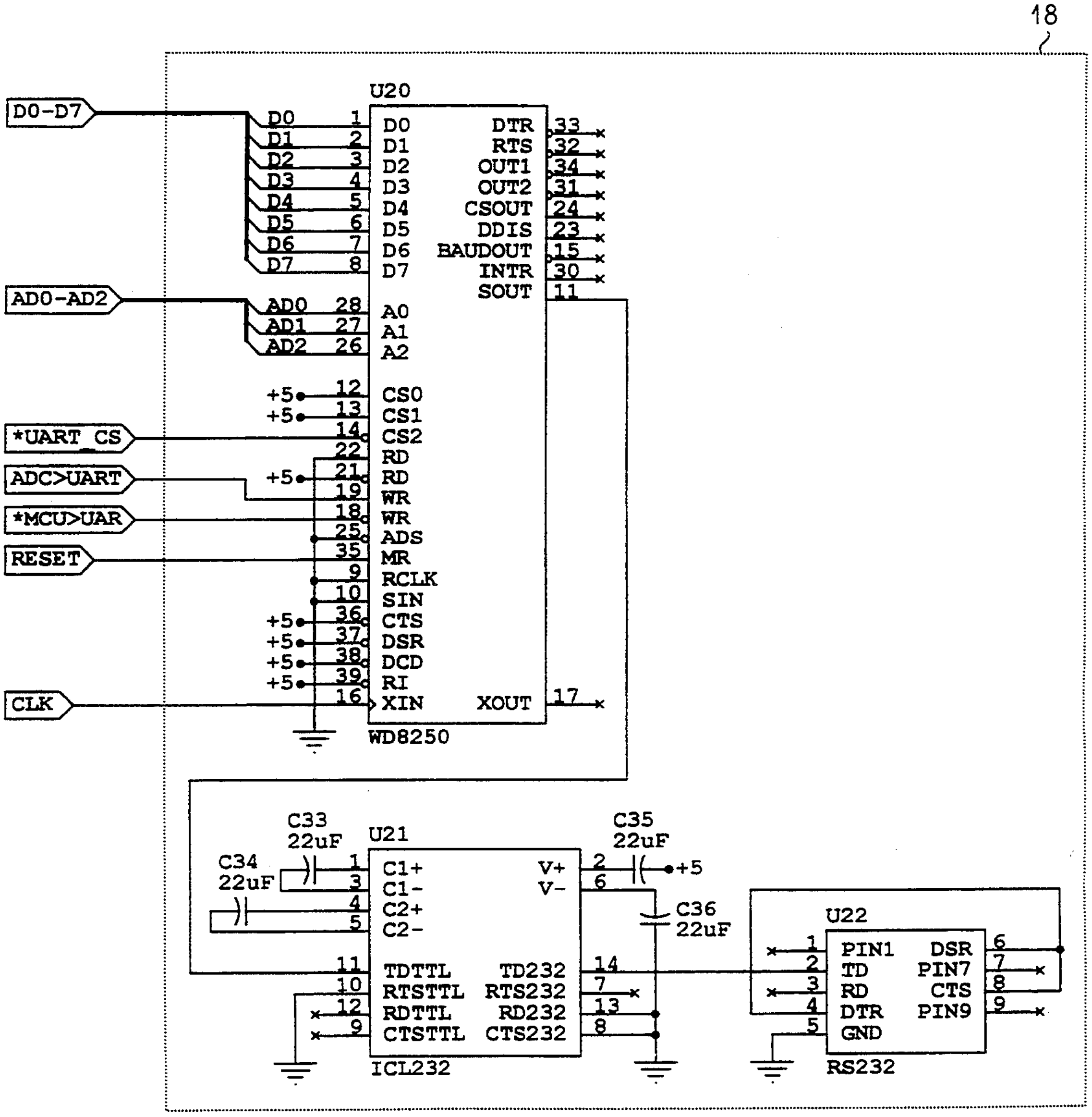

FIG. 2E is a schematic of the external serial port 18 used in a preferred embodiment of the present invention. Its inputs are the eight-bit word labelled "D[0 . . . 7]" as well as MCU control signals AD[0 . . . 2], *UART_CS, ADC>UART, *MCU>UAR, RESET, CLK. The external serial port has as its output the signal TD.

The function of the external serial port is to transmit in standard RS-232 format the digital signal D[0 . . . 7] it receives from the analog-to-digital converter 16. The conversion to this format is a two-step process. First, the digital signal is serialized by an 8250 UART integrated circuit U20, the output of which is in the zero-to-five-volt range. Second, this serial signal is converted to the RS-232 range by an amplifier circuit U21. The signal is then ready to be sent to the PC through a nine-pin connector U22.

The PC serial port receives the RS-232 signal sent from the external device. Its output is the digital signal that it reconstructs from this input. The PC serial port is identical to the one on the external device; both provide an 8250 UART with an RS-232 converter, and both are configured to the same data format and baud rate. The PC serial port is initialized in software using means known in the art (using the "init_comport()" procedure shown in the source code listing in the Appendix). Once initialized, the serial port is activated automatically whenever a data byte is sent; no additional code is required for its operation.

The single-note filter is implemented entirely in software as an interrupt service routine. This routine reads the digital signal that is generated by the PC serial port and de-multiplexes this signal back into its four component signals. It then digitally filters each of those signals twelve times, each time isolating the frequency-band of a particular note. The note volumes are then determined from the results of this filtering.

Figure 5:
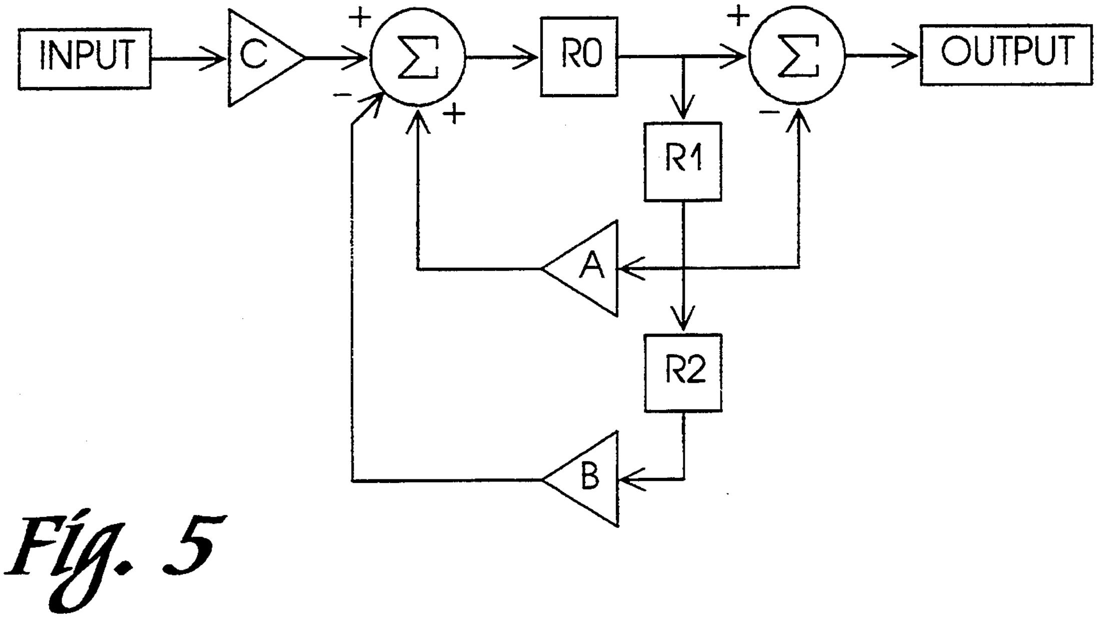
FIG. 5 is a flow chart of a digital filter algorithm used in a preferred embodiment of the present invention.

FIG. 5 is a diagram showing a preferred embodiment of a digital filter algorithm that used to isolate each note's frequency-band. In the present preferred embodiment, the digital filter algorithm is implemented in software.

In FIG. 5, each square box R0, R1, and R2 represents a register that remembers the value of its last input. Each circle Σ represents an accumulator whose output equals the sum of its inputs. Each triangle A, B, and C represents a multiplier whose output equals its input multiplied by some fixed gain. The flow-chart shown in FIG. 6 conveys the same information algebraically.

The characteristics of this filter, i.e., its center frequency F and its sharpness factor Q, are determined entirely by the gain factors A, B, and C, in accordance with the following relationships:

$$A = 2\cos(2\pi F)\exp\left(\frac{\pi F}{Q}\right)$$

$$B = \exp\left(\frac{-2\pi F}{Q}\right)$$

$$C = \cos(\pi F)\sqrt{1 - A + B}$$

Depending on the values we choose for these gain factors, the filter can display any desired center frequency and sharpness. Hence, a single filter structure with changeable gain factors can be used to implement all twelve of the filters needed for each octave range.

Figure 7:
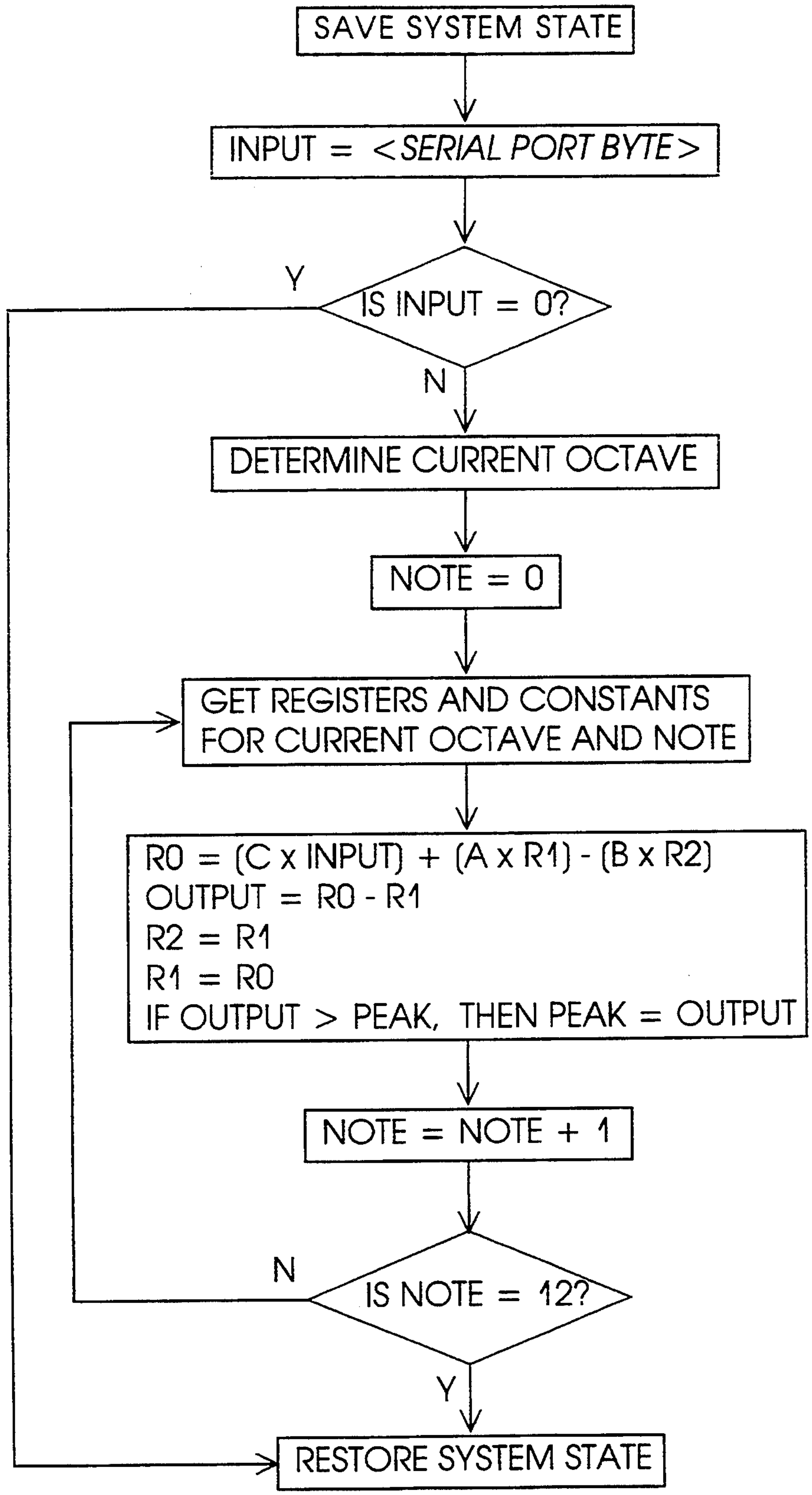
FIG. 7 is a flow chart of a filtering routine used in a preferred embodiment of the present invention.

The actual filtering routine (called "serial_handler()" in the source code listing in the Appendix) is invoked whenever a data byte is received by the serial port. Its implementation is outlined in the flow-chart shown in FIG. 7.

Figure 6:
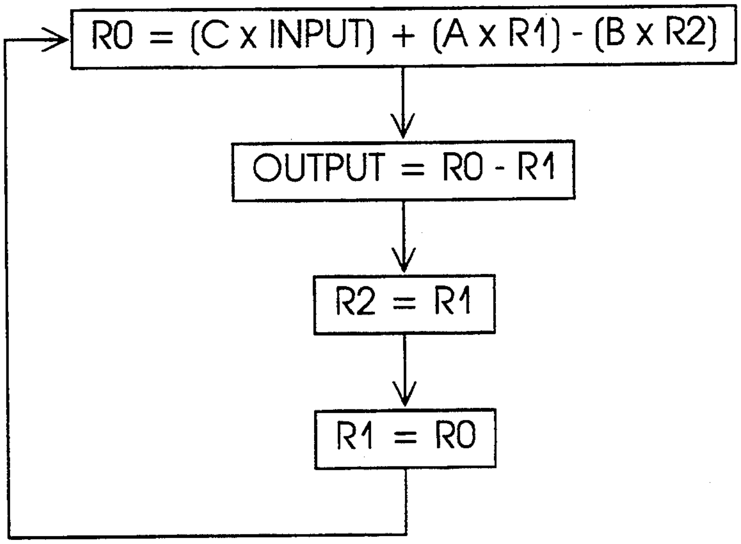
FIG. 6 is a flow chart showing algebraically the processes performed in the flow chart shown in FIG. 5.

This routine utilizes the filtering algorithm of FIGS. 5 and 6 described earlier, but executes it twelve times (using different sets of registers and gain factors each time) in order to filter all twelve notes of the octave to which the current input corresponds. The routine also stores the current maximum value of each filter output (using the "peak[]" array in the source code listing). Doing so allows the other software routines to determine what the current volume of any particular note is by reading the "peak[]" array.

Figure 8:
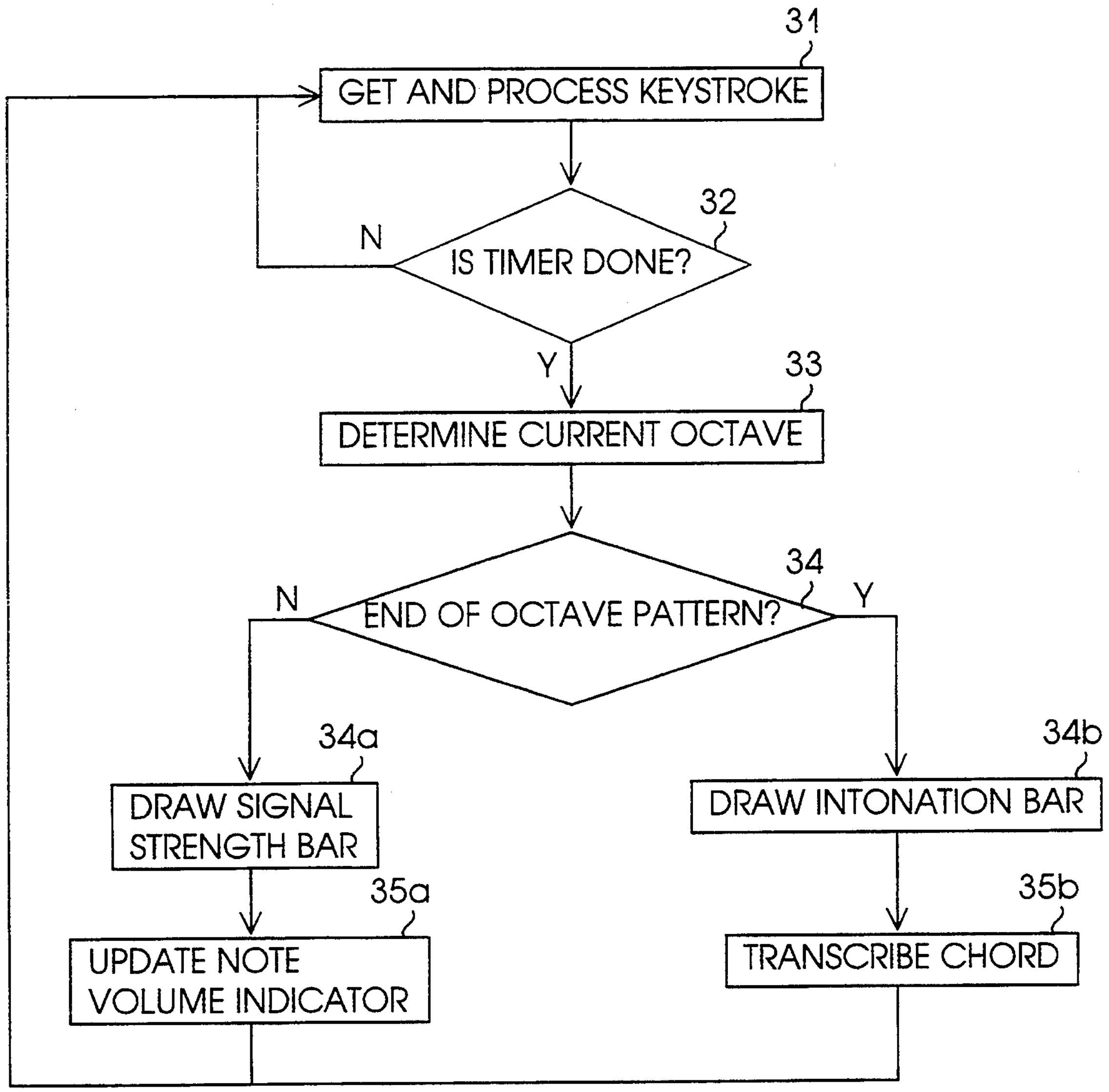
FIG. 8 is a flow chart of a preferred embodiment of a user interface loop.

FIG. 8 is a flow chart of a preferred embodiment of a user interface loop. The user interface loop is a continuously repeating set of software routines which provide an interface between the user and the program. (These routines are all listed in the source code listing in the Appendix, where the top-level interface routine is the "main_loop()" procedure.)

The first step 31 in the interface loop gets and processes any keystroke that has been made by the user. If no keystroke has occurred, this step is bypassed; otherwise, the program reads the keystroke from the keyboard buffer and performs the appropriate function. Keyboard commands generally involve editing an on-screen item, such as altering a parameter value, or changing the system state in some way, such as beginning a transcription. (All of these functions are handled in the source code listing within the "get_command()" procedure.)

The second step 32 in the interface loop checks a timer to see if a certain time interval has lapsed. If not, the program returns to the first step 31. Otherwise, the timer is reset and the program continues. The purpose of this step 32 is to ensure that the remaining steps in the loop are executed at regular intervals. Note that the timer is incremented every time the interrupt service routine ("serial_handler()") is invoked.

The third step 33 determines which octave range of notes should currently be displayed by the interface loop. This octave range is chosen using the same repeating selection pattern that is used by the note detection chain described above. It should be noted, however, that the octave range that is being processed by the note detection chain and the octave range that is being displayed by the user interface loop are not necessarily the same octave range. If the current position in the octave range selection pattern is any but the idle (16th) position, the program next executes steps 34*a* and 35*a*; otherwise, it executes steps 34*b* and 35*b*.

Step 34*a* updates the signal strength indicator for the current octave range. The signal strength indicator is a screen item which indicates the peak amplitude and degree of clipping of each of the four digital signals entering the PC. (In the source code listing in the Appendix, the interrupt service routine "serial_handler()" keeps track of the peak amplitudes in the "signal_amplitude[]" array. The same routine keeps track of the number of times each signal reaches its cutoff point in the "signal_cutoff[]" array.) Step 34*a* of the interface loop makes use of these arrays to convey to the user the peak amplitude and degree of clipping of each signal.

Step 35*a* updates the note volume indicator for each note in the current octave range. The note volume indicator is a screen item which displays the pitch and volume of each note as it is played. The program computes each note's volume by subtracting its filter response (found in the "peak[]" array) from that of the larger of its two neighbors. The program also labels each note which attains a volume above a certain threshold.

Figure 9:
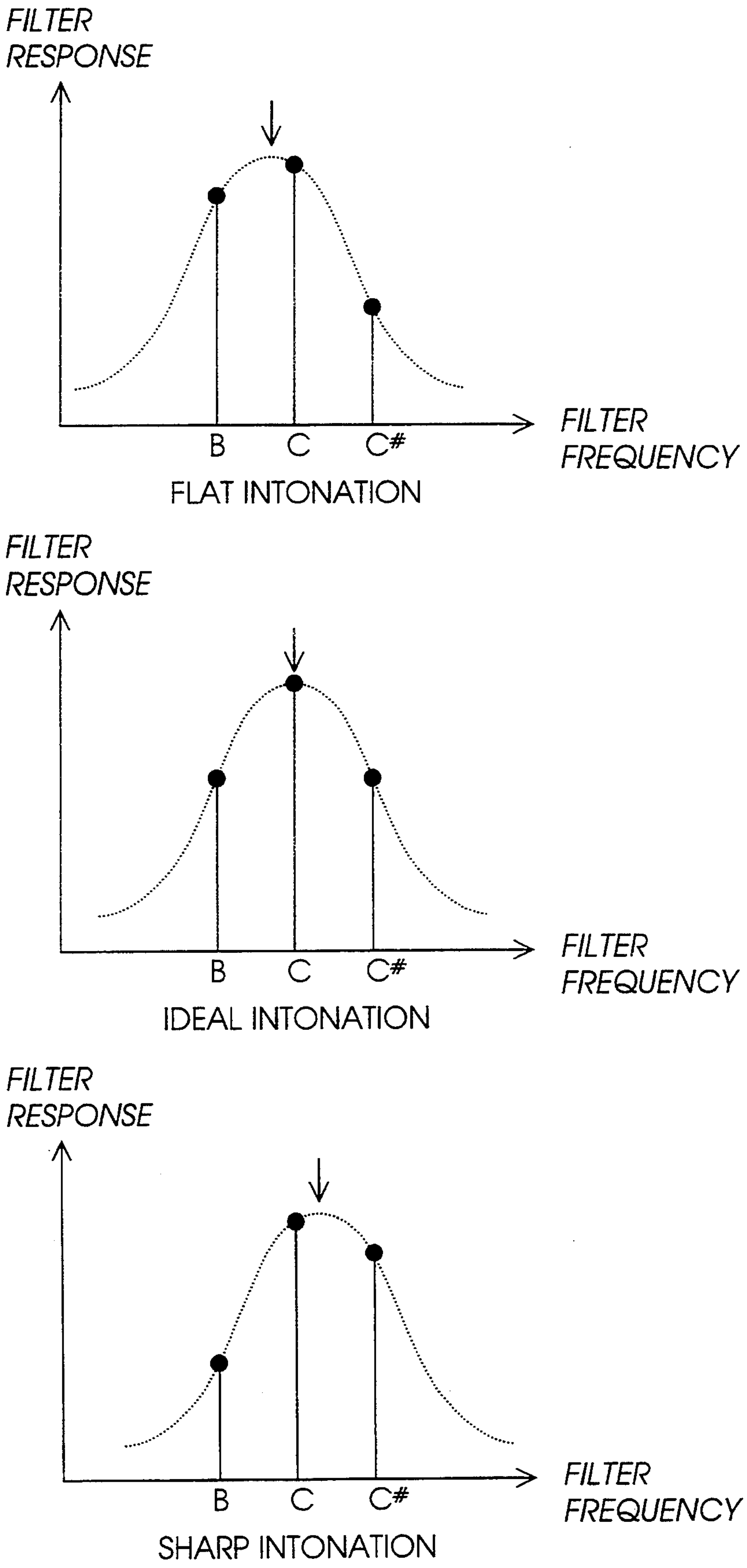
FIG. 9 is a diagram demonstrating the ratios used in a preferred embodiment of the present invention to determine the sharpness or flatness of an incoming acoustic signal

Step 34*b* updates the intonation indicator. The intonation indicator is a screen item which indicates the extent to which the detected notes are sharp or flat. The program is able to calculate this information by comparing the filter response of the strongest note with those of its two neighbors. If the lower-pitched neighbor has a greater amplitude than the higher-pitched neighbor, then the notes are flat; the reverse situation implies the notes are sharp. The degree of flatness or sharpness is determined by the ratio of the center note's amplitude with that of the larger of its two neighbors; a large ratio implies good intonation, whereas near equality implies poor intonation. This is shown graphically in FIG. 9.

Step 35*b* updates the chord timeline. The chord timeline is a screen item which tells the user the name of the chord currently being played. The program determines this chord name by summing the note volumes for each family of notes (e.g., the volumes of all the C#'s are added together). The program picks from these sums the three most predominant note families, and then looks in a reference table to determine which chord, if any, corresponds to the three note families selected. If there is such a chord, the program conveys its name to the user. (This process is implemented in the source code listing in the Appendix within the "transcribe_chord()" procedure.)

Figure 10A:
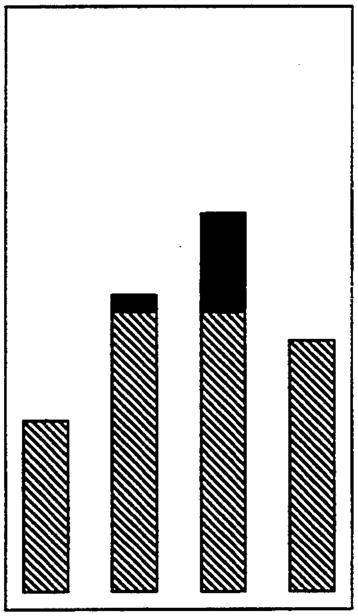
FIGS. 10A–E show the graphical output on a computer monitor screen in a preferred embodiment of the present invention.

FIGS. 10A–E show the graphical output of the present preferred embodiment. FIG. 10A shows a signal strength indicator, which in the present preferred embodiment appears as the left-most window at the bottom of the monitor screen. It indicates to the user if the signal coming from the tape deck, CD player, or other audio signal source is too strong or too weak.

The signal strength indicator displays four vertical bars, the heights of which are constantly fluctuating. The heights of these bars correspond to the strength of the incoming audio signal. If the tops of the bars turn magenta, it indicates that the signal is being clipped. The signal control knob on the external device should be adjusted so that the tallest bar is roughly half the window height. This allows the signal strength to be maximized but clipping to be minimized.

Figure 10B:
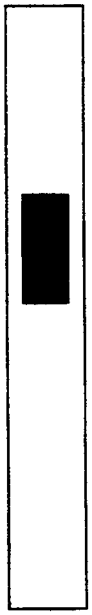

FIG. 10B shows an intonation indicator that, in a preferred embodiment of the present invention, appears as the second window from the left at the bottom of the monitor screen. The intonation indicator tells the user to what extent the notes of the musical passage are sharp or flat. When the bar inside the window is magenta, it indicates that the notes are sharp; when red, it indicates that the notes are flat. The size of the bar indicates to what extent the notes are sharp or flat. It is desirable, therefore, that this bar be as short as possible.

Figure 10C:
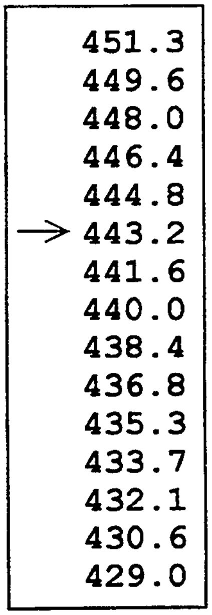

FIG. 10C shows a pitch adjuster that, in a preferred embodiment of the present invention, appears as the third window from the left at the bottom of the monitor screen. The pitch adjuster allows the user to change the intonation of the computer so that it matches that of the music. Thus, the intonation indicator and the pitch adjuster are used in conjunction with one another.

There is an arrow on the pitch adjuster which points to a number. That number is the adjusted frequency of the pitch A4, whose standard frequency is 440.0 Hz. In the present preferred embodiment, the value is adjusted by pressing CTRL-F on the keyboard. The arrow becomes highlighted, and may be moved up or down using the arrow keys. If the intonation indicator is mostly magenta, the arrow should be moved up several places. If the intonation indicator is mostly red, the arrow is moved down several places. If the intonation indicator is both red and magenta and very short, the arrow should not be moved at all. The <ENTER> key is then pressed. The arrow de-highlights, and the computer adjusts its intonation to the new setting just selected. The user looks at the intonation indicator again. If it is still mostly red or mostly magenta, or if the bar is very tall in both directions, the process is repeated until the proper intonation is achieved.

Figure 10D:
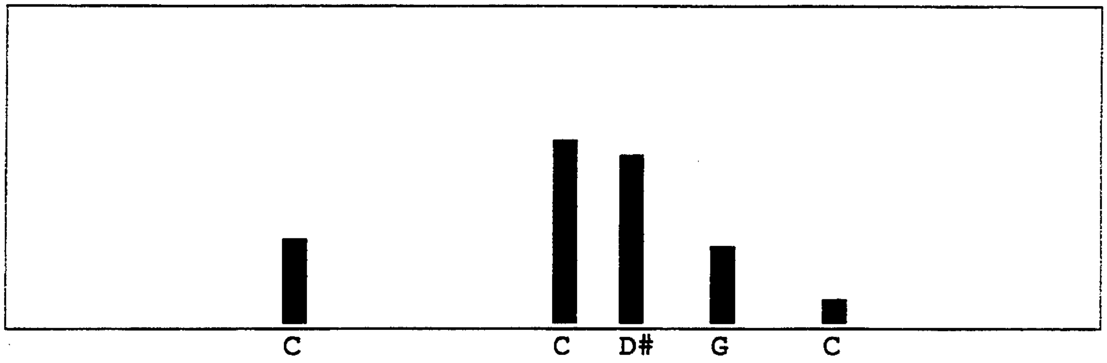

FIG. 10D shows a note volume indicator that, in a preferred embodiment, appears inside the rightmost window at the bottom of the monitor screen. The note volume indicator displays the pitch and volume of every note as it is played. When a note is played, a bar appears, the position and height of which correspond to the pitch and volume of the note. If the note's volume is sufficient strong, the bar becomes highlighted and the note's name appears underneath it. The user may adjust the volume at which the notes become highlighted and labelled by pressing CTRL-N. Doing so causes a horizontal line, called the noise threshold, to appear in yellow. The noise threshold may then be moved up or down with the arrow keys, raising or lowering the volume at which notes are recognized. The user must press the <ENTER> key when done adjusting the noise threshold.

Figure 10E:
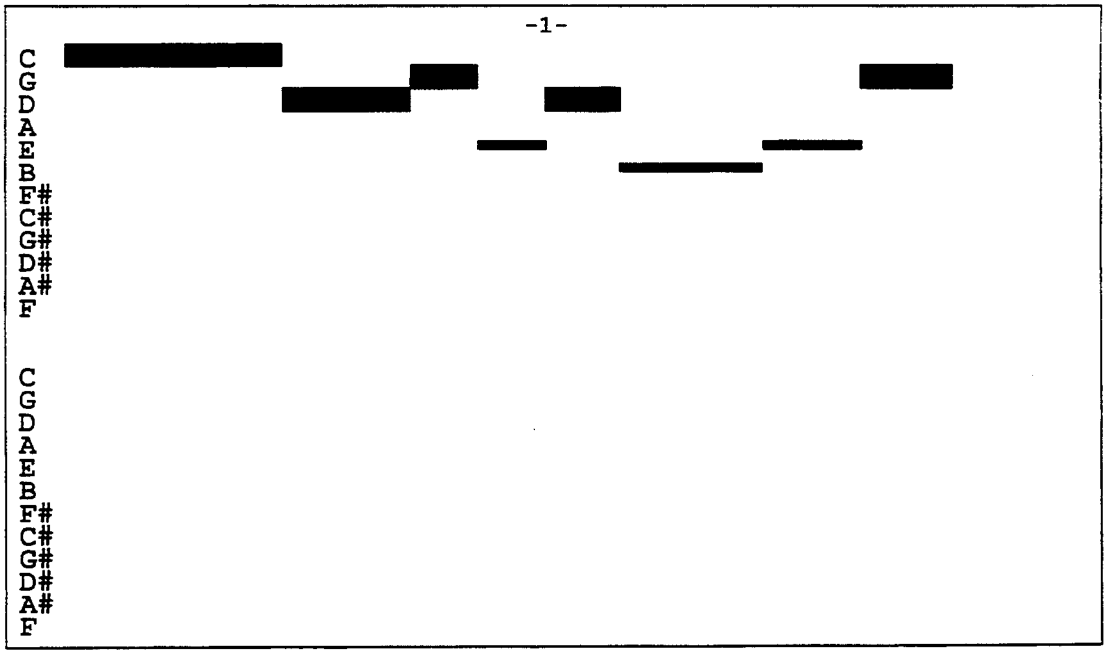

FIG. 10E shows a chord timeline that, in a preferred embodiment, occupies the remainder of the screen. It informs the user what chords have been played over the course of the musical passage. When the user presses CTRL-B, a column of chord names appears running down the left edge of the screen, as well as a page number and the message "Transcribing" at the top of the screen. A number of horizontal lines should also appear stretching to the right as time passes. These lines indicate which, if any, musical chord is currently predominant. If a line is thick, it indicates a major triad; if it is thin, it indicates a minor triad. This information, in conjunction with the chord name to the left of the line, tells the user the complete name of the chord being played.

The user may add comments above the chord timeline in order to make it easier to remember where the chords belong within the music. If the music has lyrics, the user may wish to fill in the words as they are sung. If the music is mostly instrumental, the user may find it useful to make a comment at the downbeat of every measure. To make a comment, the user simply types the comment while the transcription is taking place, and the comment appears at the current place in the transcription. Comments are separated by pressing either the space bar or the <ENTER> key. The transcription is termination by pressing CTRL-E. The user may then page through the transcription using the PgUp and PgDn keys.

In the present preferred embodiment, the user may press CTRL-W to write the transcription to disk. When the program asks for the name of the file, the user enters a name of not more than eight characters. The transcription will be written to a file bearing that name in the C: SCRIPT FILES directory. After a number of transcriptions have been written, the user may read one back by pressing CTRL-R. The user then enters the name of the file, and the transcription is loaded into memory for the user to examine.

In the present preferred embodiment, the program is exited by pressing CTRL-X.

APPENDIX

PROGRAM SOURCE CODE

```
{
   /* Loads from disk the constants that are used by the chord detection
      algorithm */

   int handle,bytes;
   char filename[32];

   strcpy(filename,"CONST\\CHORD.BIN");

   if ((handle = open(filename,O_RDONLY|O_BINARY,S_IWRITE|S_IREAD))
      == -1) {
      cprintf("\nError opening file\n");
      finish(1);
   }

   if ((bytes = read(handle,chord_index,CHORD_INDEX_SIZE)) == -1) {
      cprintf("\nRead failed\n");
      finish(1);
   }

   if ((bytes = read(handle,chord_name,CHORD_NAME_SIZE)) == -1) {
      cprintf("\nRead failed\n");
      finish(1);
   }

   close(handle);
}

void init_graphics()
{
   /* Initializes the graphics screen */
```

```
int gdriver, gmode, errorcode;

/* Set the graphics mode */

gdriver = VGA;
gmode = VGAHI;
initgraph(&gdriver, &gmode, "");
errorcode = graphresult();
if (errorcode != grOk) {
   cprintf("\nError initializing graphics: %s\n",grapherrormsg(errorcode));
   finish(1);
}
graphics_initialized = TRUE;
settextjustify(LEFT_TEXT,TOP_TEXT);

/* Draw the signal amplitude box */

draw_mode(panel_color);
horz_line(324,SIGNAL_BOX_POSITION-4,SIGNAL_BOX_POSITION+35);
horz_line(325,SIGNAL_BOX_POSITION-4,SIGNAL_BOX_POSITION+35);
horz_line(458,SIGNAL_BOX_POSITION-4,SIGNAL_BOX_POSITION+35);
horz_line(459,SIGNAL_BOX_POSITION-4,SIGNAL_BOX_POSITION+35);
vert_line(SIGNAL_BOX_POSITION-4,324,459);
vert_line(SIGNAL_BOX_POSITION-3,324,459);
vert_line(SIGNAL_BOX_POSITION+34,324,459);

chord_height[1] = 80;
chord_height[2] = 40;
chord_height[3] = 96;
chord_height[4] = 56;
chord_height[5] = 112;
chord_height[6] = 72;
chord_height[7] = 32;
chord_height[8] = 88;
chord_height[9] = 48;
chord_height[10] = 104;
chord_height[11] = 64;
chord_height[12] = 120;
chord_height[13] = 120;
chord_height[14] = 120;
chord_height[15] = 120;

strcpy(title,"");

init_filter_constants();
init_chord_constants();
init_graphics();
init_comport();
}

void init_filter_constants()
{
   /* Loads from disk the constants that are used by the filtering
      algorithm */

   int handle,bytes;
   char filename[32];

   strcpy(filename,"CONST\\FILTERxx.BIN");

   if (filter_set>=0) {
      filename[12] = 'S';
      filename[13] = filter_set+48;
   }
   else {
      filename[12] = 'F';
      filename[13] = -filter_set+48;
   }
```

```
   if ((handle = open(filename,O_RDONLY|O_BINARY,S_IWRITE|S_IREAD))
         == -1) {
      cprintf("\nError opening file\n");
      finish(1);
   }

   if ((bytes = read(handle,product,PRODUCT_SIZE)) == -1) {
      cprintf("\nRead failed\n");
      finish(1);
   }

   close(handle);
}


void init_chord_constants()

   for (i=15;i<32;i+=32) octave[i] = 0;
   octave[31] = -1;

   for (i=0;i<5;i++) {
      signal_amplitude[i] = 0;
      signal_cutoff[i] = 0;
      for (j=0;j<14;j++) {
         r0[i][j] = 0;
         r1[i][j] = 0;
         r2[i][j] = 0;
         output[i][j] = 0;
         peak[i][j] = 0;
      }
      for (j=0;j<12;j++)
         filter_active[i][j] = FALSE;
   }

   strcpy(&note_name[0][0],"C");
   strcpy(&note_name[1][0],"C#");
   strcpy(&note_name[2][0],"D");
   strcpy(&note_name[3][0],"D#");
   strcpy(&note_name[4][0],"E");
   strcpy(&note_name[5][0],"F");
   strcpy(&note_name[6][0],"F#");
   strcpy(&note_name[7][0],"G");
   strcpy(&note_name[8][0],"G#");
   strcpy(&note_name[9][0],"A");
   strcpy(&note_name[10][0],"A#");
   strcpy(&note_name[11][0],"B");

   for (i=0;i<12;i++)
      note_family_sum[i] = 0;

   for (i=0;i<MAX_PAGES;i++) {
      for (j=0;j<MAX_LINES;j++) {
         for (k=0;k<MAX_COLUMNS;k++)
            chord_transcription[i][j][k] = NO_CHORD;
         for (k=0;k<MAX_COMMENTS;k++)
            comment_transcription[i][j][k] = 0;
      }
   }

   chord_color[0] = LIGHTGREEN;
   chord_color[1] = LIGHTCYAN;
   chord_color[2] = LIGHTBLUE;
   chord_color[3] = LIGHTMAGENTA;
   chord_color[4] = LIGHTRED;
   chord_color[5] = YELLOW;
   chord_color[6] = LIGHTGREEN;
   chord_color[7] = LIGHTCYAN;
   chord_color[8] = LIGHTBLUE;
   chord_color[9] = LIGHTMAGENTA;
   chord_color[10] = LIGHTRED;
```

```
   chord_color[11] = YELLOW;
   chord_color[12] = LIGHTGRAY;
   chord_color[13] = LIGHTGRAY;
   chord_color[14] = LIGHTGRAY;
   chord_color[15] = LIGHTGRAY;

   chord_height[0] = 24;

unsigned char flat_bar_color = RED;
unsigned char filter_bar_color = LIGHTMAGENTA;
unsigned char hilite_color = YELLOW;
unsigned char note_color = YELLOW;
unsigned char comment_color = YELLOW;
unsigned char message_color = LIGHTRED;
unsigned char page_color = YELLOW;
unsigned char all_colors = WHITE;


void init();
void init_filter_constants();
void init_chord_constants();
void init_graphics();
void init_comport();
void main_loop();
void get_command();
void update_screen();
void far interrupt serial_handler();
void finish(int errorcode);

void disable_serial_port();
void enable_serial_port();
void draw_mode(unsigned char color);
void erase_mode(unsigned char color);
void horz_line(int y, int x1, int x2);
void vert_line(int x, int y1, int y2);
void vert_bar(int x, int y1, int y2);
void fill_rect(int x1, int y1, int x2, int y2);
void outtextxy_dbg(int x, int y, char *textstring);
void beep();
void fix_delay();
void place_filter_pointer();
void begin_transcription();
void end_transcription();
void transcribe_chord();
void display_page();
void new_page();
void read_chord_file();
void write_chord_file();
void get_string(int x, int y, char *str);


void main()
{
   init();
   main_loop();
}


void init()
{
   /* Initializes all global structures */

   int i,j,k;

   for (i=0;i<32;i+=2) octave[i] = 4;
   for (i=1;i<32;i+=4) octave[i] = 3;
   for (i=3;i<32;i+=8) octave[i] = 2;
   for (i=7;i<32;i+=16) octave[i] = 1;
#define MAX_PAGES 99          /* maximum number of transcribed pages */
```

```
#define MAX_LINES 2             /* maximum number of lines per page */
#define LINE_HEIGHT 160         /* height of each line */
#define MAX_COLUMNS 144         /* maximum number of columns per line */
#define COLUMN_WIDTH 4          /* width of each column */
#define MAX_COMMENTS 72         /* maximum number of comments per line */
#define COMMENT_WIDTH 8         /* width of each comment */
#define NO_CHORD 255            /* chord index for unrecognized chord */


typedef char boolean;


int cctave[32];
char signal_amplitude[5], signal_cutoff[5];
int r0[5][14], r1[5][14], r2[5][14], output[5][14], peak[5][14];
boolean filter_active[5][12];
char note_name[12][4];
long note_family_sum[12];
unsigned char far chord_transcription[MAX_PAGES][MAX_LINES][MAX_COLUMNS];
char far comment_transcription[MAX_PAGES][MAX_LINES][MAX_COMMENTS];
unsigned char chord_color[16];
int chord_height[16];
char title[16];
int product[5][14][256];
unsigned char chord_index[4096];
char chord_name[256][8];
unsigned char old_lcr, old_baud0, old_baud1;
unsigned int old_handler_off, old_handler_seg;
unsigned char old_mcr, old_ier, old_intmask;

unsigned int gfx_scrnbase = GFX_SCRNBASE;
int comport = COMPORT;
boolean graphics_initialized = FALSE;
boolean comport_initialized = FALSE;
long interrupt_counter = 0;
long clock = 0;
long old_clock = 0;
int filter_octave_index = 0;
int display_octave_index = 0;
int filter_set = 0;
int noise_level = NOISE_LEVEL_INIT;
int filter_max = 0;
int filter_max_left = 0;
int filter_max_right = 0;
int page_number = 0;
int line_number = 0;
int column_number = 0;
int comment_line_number = 0;
int comment_column_number = 0;
int last_page_number = 0;
boolean new_comment = TRUE;
enum {absolute, relative} display_mode = relative;
enum {edit_off, filter_freq, noise_lev} edit_mode = edit_off;
enum {trans_off, trans_on} transcription_mode = trans_off;
enum {draw, erase} gfx_mode = draw;
unsigned char background_color = BLACK;
unsigned char panel_color = RED;
unsigned char cutoff_bar_color = MAGENTA;
unsigned char sharp_bar_color = MAGENTA;

/* SCRIPT.CPP: Analyzes an audio-frequency signal to determine its musical
   components */

#pragma inline

#include <conio.h>
#include <dos.h>
#include <fcntl.h>
#include <graphics.h>
#include <io.h>
#include <stdio.h>
```

```
#include <stdlib.h>
#include <string.h>
#include <sys\stat.h>

#define FALSE 0
#define TRUE 1
#define CTRL_B 2
#define CTRL_E 5
#define CTRL_F 6
#define CTRL_N 14
#define CTRL_R 18
#define CTRL_W 23
#define CTRL_X 24
#define BACKSPACE 8
#define ENTER 13
#define ESC 27
#define SPACE 32
#define HOME 71
#define UP 72
#define PG_UP 73
#define LEFT 75
#define RIGHT 77
#define END 79
#define DOWN 80
#define PG_DN 81
#define RIGHT_ARROW 26
#define LEFT_ARROW 27
#define PRODUCT_SIZE 35840    /* total size of "product" data structure, to be
                                 loaded from disk */
#define CHORD_INDEX_SIZE 4096 /* total size of "chord_index" data structure,
                                 to be loaded from disk */
#define CHORD_NAME_SIZE 2048  /* total size of "chord_name" data structure, to
                                 be loaded from disk */
#define GFX_SCRNBASE 40960    /* base address of graphics screen */
#define COMPORT 0             /* serial port number */
#define INTERRUPT_FREQ 4800   /* frequency of serial port interrupt */
#define SAMPLING_PERIOD 24    /* number of interrupt cycles alotted to sample
                                 one octave of filters.  Thus, the output of
                                 each filter is sampled at a rate of:
                                 INTERRUPT_FREQ/
                                          (SAMPLING_PERIOD*2^(5-octave#)) */
#define FILTER_BAR_RATIO 128  /* ratio of filter response to bar height */
#define NOISE_LEVEL_INIT 256  /* amplitude below which a filter response is
                                 considered to be noise (initial setting) */
#define SIGNAL_BOX_POSITION 8         /* horizontal position of signal box */
#define INTONATION_BOX_POSITION 88    /* horizontal position of intonation box*/
#define FREQUENCY_BOX_POSITION 144    /* horizontal position of frequency box */
#define FILTER_BOX_POSITION 248       /* horizontal position of filter box */
#define CHORD_BOX_POSITION 64         /* horizontal position of chord box */

   if (input > signal_amplitude[filter_octave])
      signal_amplitude[filter_octave] = input;


   /* Increment "signal_cutoff" if input is at its limit */

   if (input == 127)
      signal_cutoff[filter_octave]++;


   /* Now update the octave of filters indicated by "filter_octave" */

   asm   mov cl,0;              // cl = note
   asm   mov ax,filter_octave;
   asm   shl ax,1;
   asm   shl ax,1;
   asm   mov bx,ax;
   asm   shl ax,1;
   asm   add bx,ax;
   asm   shl ax,1;
   asm   add bx,ax;
```

```
   asm   mov si,bx;                // si = octave*28+note*2

note_loop:
   asm   mov bl,input;
   asm   mov bh,cl;
   asm   shl bx,1;
   asm   mov dx,product[bx+28672]; // dx = c*input

   asm   mov ax,r2[si];
   asm   mov bl,ah;
   asm   mov bh,cl;
   asm   shl bx,1;
   asm   sub dx,product[bx+14336]; // dx = c*input - b*r2(partial)

   asm   mov bl,al;
   asm   mov bh,cl;
   asm   shl bx,1;
   asm   sub dx,product[bx+21504]; // dx = c*input - b*r2

   asm   mov ax,r1[si];
   asm   mov bl,ah;
   asm   mov bh,cl;
   asm   shl bx,1;
   asm   add dx,product[bx];       // dx = c*input - b*r2 + a*r1(partial)

   asm   mov bl,al;
   asm   mov bh,cl;
   asm   shl bx,1;
   asm   add dx,product[bx+7168];  // dx = c*input - b*r2 + a*r1

   asm   mov r0[si],dx;            // r0 = dx
   asm   mov r1[si],dx;            // r1 = r0
   asm   mov r2[si],ax;            // r2 = old r1
   asm   sub dx,ax;
   asm   mov output[si],dx;        // output = r0 - old r1

   asm   cmp dx,peak[si];
   asm   jle not_peak;

         erase_mode(all_colors);
         vert_bar(bar_position,464,471);
         vert_bar(bar_position+8,464,471);
      }

      /* Increment the note-family sum */

      long_temp = filter_rel_response;
      weighted_response = (long_temp << (4-display_octave));
      note_family_sum[display_note] += weighted_response;
   }

   peak[display_octave][12] = 0;
   peak[display_octave][13] = 0;
}

void far interrupt serial_handler()
{
   /* Interrupt handler which is invoked whenever a databyte is received
      through the serial port */

   int filter_octave;
   char input;


   /* First, save the system state */

   asm   push ax bx cx dx si di;     // save general registers
   asm   pushf;                      // save flags register
```

```
/* Retrieve the databyte waiting at the serial port; store it in "input" */

asm   push ds;
asm   mov ax,DGROUP;
asm   mov ds,ax;
asm   mov dx,3F8h;
asm   in al,dx;                   // get input from serial port
asm   xor al,80h;                 // center signal at zero
asm   mov input,al;
asm   pop ds;


/* Determine which octave to process */

filter_octave = octave[filter_octave_index];
filter_octave_index++;
if ((filter_octave_index == 32) || (input == -128))
   filter_octave_index = 0;


/* Skip routine if at end of octave cycle */

if ((filter_octave == -1) || (input == -128))
   goto filter_skip;


/* Update "signal_amplitude" if input is greater than before */
}
else
   draw_label = FALSE;

if ((filter_rel_response < noise_level) &&
    (filter_active[display_octave][display_note] == TRUE)) {
   filter_active[display_octave][display_note] = FALSE;
   erase_label = TRUE;
}
else
   erase_label = FALSE;

bar_position = FILTER_BOX_POSITION+
                  ((display_octave-1)*12+display_note)*8;

if (display_mode == absolute) {
   bar_height = filter_abs_response/FILTER_BAR_RATIO;
   if (bar_height > 128) bar_height = 128;
   bar_color = panel_color;
}

else if (display_mode == relative) {
   bar_height = filter_rel_response/FILTER_BAR_RATIO;
   if (bar_height > 128) bar_height = 128;
   if (filter_active[display_octave][display_note])
      bar_color = filter_bar_color;
   else
      bar_color = panel_color;
}

erase_mode(all_colors);
vert_bar(bar_position,328,455-bar_height);
erase_mode(15-bar_color);
vert_bar(bar_position,456-bar_height,455);
draw_mode(bar_color);
vert_bar(bar_position,456-bar_height,455);


/* Draw a segment of the noise level line (relative mode only) */

if (display_mode == relative) {
   if (filter_rel_response < noise_level) {
```

```
        if (edit_mode == noise_lev)
           draw_mode(hilite_color);
        else
           draw_mode(panel_color);
        horz_line(456-noise_level/FILTER_BAR_RATIO,bar_position,
                  bar_position+7);
     }
  }

  /* Label the bar with its note name */

  if (draw_label == TRUE) {
     strcpy(note_string, &note_name[display_note][0]);
     setcolor(note_color);
     outtextxy_dbg(bar_position,464,note_string);
  }
  else if (erase_label == TRUE) {
  draw_mode(panel_color);
  vert_bar(SIGNAL_BOX_POSITION-8+display_octave*8,456-bar_height,455);
}
else {
  bar_height = (signal_cutoff[display_octave]*64)/SAMPLING_PERIOD;
  if (bar_height > 64) bar_height = 64;
  erase_mode(all_colors);
  vert_bar(SIGNAL_BOX_POSITION-8+display_octave*8,328,391-bar_height);
  draw_mode(cutoff_bar_color);
  vert_bar(SIGNAL_BOX_POSITION-8+display_octave*8,392-bar_height,391);
  draw_mode(panel_color);
  vert_bar(SIGNAL_BOX_POSITION-8+display_octave*8,392,455);
}

signal_amplitude[display_octave] = 0;
signal_cutoff[display_octave] = 0;


/* Update the screen display for all the filters in the octave */

for (display_note=0; display_note<12; display_note++) {

  filter_note = display_note + 1;  /* filter_note is offset because filter
                                      octaves have an extra note at either
                                      end */


  /* Determine the absolute and relative response of the current filter */

  filter_abs_response = peak[display_octave][filter_note];
  filter_left_response = peak[display_octave][filter_note-1];
  filter_right_response = peak[display_octave][filter_note+1];

  if (filter_left_response >= filter_right_response)
     filter_rel_response = filter_abs_response - filter_left_response;
  else
     filter_rel_response = filter_abs_response - filter_right_response;
  if (filter_rel_response < 0)
     filter_rel_response = 0;

  peak[display_octave][filter_note-1] = 0;


  /* Update filter_max if current filter has the largest response */

  if ((filter_abs_response >= filter_left_response) &&
      (filter_abs_response >= filter_right_response) &&
      (filter_abs_response > filter_max)) {
     filter_max = filter_abs_response;
     filter_max_left = filter_left_response;
     filter_max_right = filter_right_response;
  }
```

```
/* Draw a bar to represent the filter response */

if ((filter_rel_response >= noise_level) &&
    (filter_active[display_octave][display_note] == FALSE)) {
   filter_active[display_octave][display_note] = TRUE;
   draw_label = TRUE;

/* Determine which octave to process */

display_octave = octave[display_octave_index];
display_octave_index++;
if (display_octave_index == 32)
   display_octave_index = 0;


/* If at end of octave cycle, update intonation box and transcribe chord */

if ((display_octave == -1) || (display_octave == 0)) {
   if (filter_max_left > filter_max_right) {
      temp = (filter_max_left - filter_max_right);
      if (filter_max != filter_max_right)
         temp = temp/(filter_max-filter_max_right);
      else
         temp = 0;
      temp = temp*64;
      bar_height = temp;
      if (bar_height > 64) bar_height = 64;
      erase_mode(all_colors);
      vert_bar(INTONATION_BOX_POSITION,392+bar_height,455);
      vert_bar(INTONATION_BOX_POSITION,328,391);
      draw_mode(flat_bar_color);
      vert_bar(INTONATION_BOX_POSITION,392,391+bar_height);
   }
   else {
      temp = (filter_max_right - filter_max_left);
      if (filter_max != filter_max_left)
         temp = temp/(filter_max-filter_max_left);
      else
         temp = 0;
      temp = temp*64;
      bar_height = temp;
      if (bar_height > 64) bar_height = 64;
      erase_mode(all_colors);
      vert_bar(INTONATION_BOX_POSITION,328,391-bar_height);
      vert_bar(INTONATION_BOX_POSITION,392,455);
      draw_mode(sharp_bar_color);
      vert_bar(INTONATION_BOX_POSITION,392-bar_height,391);
   }
   filter_max = 0;

   if (transcription_mode == trans_on)
      transcribe_chord();
   for (i=0;i<12;i++)
      note_family_sum[i] = 0;

   return;
}


/* Draw signal-amplitude bar for current octave */

if (signal_amplitude[display_octave] < 127) {
   bar_height = signal_amplitude[display_octave]/2;
   erase_mode(all_colors);
   vert_bar(SIGNAL_BOX_POSITION-8+display_octave*8,328,455-bar_height);
      valid_keystroke = TRUE;
      page_number = last_page_number;
      display_page();
   }
}
```

```
   else if (edit_mode == filter_freq) {
      if (keystroke == UP) {
         valid_keystroke = TRUE;
         setcolor(background_color);
         place_filter_pointer();
         filter_set++;
         if (filter_set == 8)
            filter_set = -8;
         setcolor(hilite_color);
         place_filter_pointer();
      }
      else if (keystroke == DOWN) {
         valid_keystroke = TRUE;
         setcolor(background_color);
         place_filter_pointer();
         filter_set--;
         if (filter_set == -9)
            filter_set = 7;
         setcolor(hilite_color);
         place_filter_pointer();
      }
   }

   else if (edit_mode == noise_lev) {
      if ((keystroke == UP) && (noise_level < 128*FILTER_BAR_RATIO)) {
         valid_keystroke = TRUE;
         noise_level+=FILTER_BAR_RATIO;
      }
      else if ((keystroke == DOWN) && (noise_level > FILTER_BAR_RATIO)) {
         valid_keystroke = TRUE;
         noise_level-=FILTER_BAR_RATIO;
      }
   }

done:
   if (! valid_keystroke)
      beep();
}


void update_screen()
{
   /* Updates the screen display for one octave of filters */

   int display_octave;
   double temp;
   int bar_height, bar_position, bar_color;
   int i;
   int display_note, filter_note;
   int filter_abs_response, filter_rel_response;
   int filter_left_response, filter_right_response;
   boolean draw_label, erase_label;
   char note_string[4];
   long long_temp, weighted_response;
         goto done;
      }

      comment_transcription[page_number][comment_line_number]
         [comment_column_number] = keystroke;
      strcpy(comment_string," ");
      comment_string[0] = keystroke;
      setcolor(comment_color);
      outtextxy_dbg(CHORD_BOX_POSITION+comment_column_number*COMMENT_WIDTH,
                    comment_line_number*LINE_HEIGHT+16,comment_string);

      comment_column_number++;
      if (comment_column_number == MAX_COMMENTS) {
         comment_column_number = 0;
         comment_line_number++;
      }
```

```
   }
}

else if (edit_mode == filter_freq) {
   if ((keystroke == ENTER) || (keystroke == ESC)) {
      valid_keystroke = TRUE;
      edit_mode = edit_off;
      disable_serial_port();
      init_filter_constants();
      enable_serial_port();
      setcolor(panel_color);
      place_filter_pointer();
   }
}

else if (edit_mode == noise_lev) {
   if ((keystroke == ENTER) || (keystroke == ESC)) {
      valid_keystroke = TRUE;
      edit_mode = edit_off;
   }
}

if (keystroke != 0)
   goto done;

keystroke = getch();

if ((edit_mode == edit_off) && (transcription_mode == trans_off)) {
   if ((keystroke == PG_UP) && (page_number > 0)) {
      valid_keystroke = TRUE;
      page_number--;
      display_page();
   }
   if ((keystroke == PG_DN) && (page_number < last_page_number)) {
      valid_keystroke = TRUE;
      page_number++;
      display_page();
   }
   if ((keystroke == HOME) && (page_number > 0)) {
      valid_keystroke = TRUE;
      page_number = 0;
      display_page();
   }
   if ((keystroke == END) && (page_number < last_page_number)) {
      valid_keystroke = TRUE;
      edit_mode = noise_lev;
   }
   else if ((keystroke == CTRL_R) && (transcription_mode == trans_off)) {
      valid_keystroke = TRUE;
      read_chord_file();
   }
   else if ((keystroke == CTRL_W) && (transcription_mode == trans_off)) {
      valid_keystroke = TRUE;
      write_chord_file();
   }
   else if ((keystroke == CTRL_X) && (transcription_mode == trans_off)) {
      valid_keystroke = TRUE;
      finish(0);
   }
   else if (((keystroke == SPACE) || (keystroke == ENTER)) &&
            (transcription_mode == trans_on) &&
            (comment_line_number < MAX_LINES)) {
      valid_keystroke = TRUE;
      new_comment = TRUE;
      comment_column_number++;
      if (comment_column_number == MAX_COMMENTS) {
         comment_column_number = 0;
         comment_line_number++;
      }
   }
```

```
   else if ((keystroke == BACKSPACE) &&
           (transcription_mode == trans_on) &&
           ((comment_line_number > 0) || (comment_column_number > 0))) {
      valid_keystroke = TRUE;
      new_comment = FALSE;
      comment_column_number--;
      if (comment_column_number < 0) {
         comment_column_number = MAX_COMMENTS - 1;
         comment_line_number--;
      }
      comment_transcription[page_number][comment_line_number]
         [comment_column_number] = 0;
      erase_mode(all_colors);
      fill_rect(CHORD_BOX_POSITION+comment_column_number*COMMENT_WIDTH,
                comment_line_number*LINE_HEIGHT+16,
                CHORD_BOX_POSITION+comment_column_number*COMMENT_WIDTH+7,
                comment_line_number*LINE_HEIGHT+23);
   }
   else if ((keystroke >= 33) && (keystroke <= 126) &&
           (transcription_mode == trans_on)) {

      valid_keystroke = TRUE;
      if ((new_comment) &&
          ((comment_line_number < line_number) ||
           ((comment_line_number == line_number) &&
            (comment_column_number*COMMENT_WIDTH <
             column_number*COLUMN_WIDTH)))) {
         comment_line_number = line_number;
         comment_column_number =(column_number*COLUMN_WIDTH)/COMMENT_WIDTH;
      }
      new_comment = FALSE;

      if (comment_line_number == MAX_LINES) {
         valid_keystroke = FALSE;

   asm   out dx,al;           // enable receiver interrupt

   asm   in al,21h;
   asm   mov old_intmask,al;  // save old interrupt mask
   asm   and al,0EFh;
   asm   out 21h,al;          // enable serial port

   asm   sti;                 // enable all interrupts

   comport_initialized = TRUE;
}


void main_loop()
{
   /* Top level program loop */

   while(TRUE) {
      get_command();
      disable_serial_port();
      clock = interrupt_counter;
      enable_serial_port();
      if (clock >= old_clock + SAMPLING_PERIOD) {
         old_clock = clock;
         update_screen();
      }
   }
}


void get_command()
{
   /* Gets and processes any pending keystroke */

   char keystroke;
```

```
   boolean valid_keystroke;
   char comment_string[4];

   if (!kbhit()) return;

   valid_keystroke = FALSE;
   keystroke = getch();

   if (edit_mode == edit_off) {
      if ((keystroke == CTRL_B) && (transcription_mode == trans_off)) {
         valid_keystroke = TRUE;
         begin_transcription();
      }
      else if (((keystroke == CTRL_E) || (keystroke == ESC)) &&
               (transcription_mode == trans_on)) {
         valid_keystroke = TRUE;
         end_transcription();
      }
      else if (keystroke == CTRL_F) {
         valid_keystroke = TRUE;
         edit_mode = filter_freq;
         setcolor(hilite_color);
         place_filter_pointer();
      }
      else if ((keystroke == CTRL_N) && (display_mode == relative)) {
```

```
void init_comport()
{
   /* Initializes the serial port and activates receiver interrupt */

   unsigned int serial_handler_off, serial_handler_seg;

   serial_handler_off = FP_OFF(serial_handler);
   serial_handler_seg = FP_SEG(serial_handler);

   asm   mov dx,3FBh;
   asm   in al,dx;
   asm   mov old_lcr,al;       // save old contents of line control register
   asm   or al,80h;
   asm   out dx,al;            // LCR set up to access baud rate

   asm   mov dx,3F8h;
   asm   in al,dx;
   asm   mov old_baud0,al;     // save old contents of baud rate divisor
   asm   mov al,02h;
   asm   out dx,al;            // baud rate divisor = 2

   asm   mov dx,3F9h;
   asm   in al,dx;
   asm   mov old_baud1,al;     // save old contents of baud rate divisor
   asm   mov al,00h;
   asm   out dx,al;            // baud rate divisor = 2

   asm   mov dx,3FBh;
   asm   mov al,03h;
   asm   out dx,al;            // set the new LCR parameters

   asm   mov dx,3F8h;
   asm   in al,dx;             // read any pending character

   asm   mov ax,350Ch;
   asm   int 21h;
   asm   mov old_handler_off,bx;
   asm   mov old_handler_seg,es;    // save old interrupt handler address
   asm   mov dx,serial_handler_off;
   asm   mov ax,serial_handler_seg;
   asm   push ds;
   asm   mov ds,ax;
   asm   mov ax,250Ch;
   asm   int 21h;              // set interrupt 0Ch to call "serial_handler"
   asm   pop ds;
```

```
asm  cli;                 // disable all interrupts

asm  mov dx,3FCh;
asm  in al,dx;
asm  mov old_mcr,al;      // save old contents of modem control register
asm  mov al,0Fh;
asm  out dx,al;           // enable OUT2 interrupt

asm  mov dx,3F9h;
asm  in al,dx;
asm  mov old_ier,al;      // save old contents of interupt enable register
asm  mov al,1;

vert_line(SIGNAL_BOX_POSITION+35,324,459);


/* Draw the intonation box */

draw_mode(panel_color);
horz_line(324,INTONATION_BOX_POSITION-4,INTONATION_BOX_POSITION+11);
horz_line(325,INTONATION_BOX_POSITION-4,INTONATION_BOX_POSITION+11);
horz_line(458,INTONATION_BOX_POSITION-4,INTONATION_BOX_POSITION+11);
horz_line(459,INTONATION_BOX_POSITION-4,INTONATION_BOX_POSITION+11);
vert_line(INTONATION_BOX_POSITION-4,324,459);
vert_line(INTONATION_BOX_POSITION-3,324,459);
vert_line(INTONATION_BOX_POSITION+10,324,459);
vert_line(INTONATION_BOX_POSITION+11,324,459);


/* Draw the filter frequency box */

draw_mode(panel_color);
horz_line(324,FREQUENCY_BOX_POSITION-4,FREQUENCY_BOX_POSITION+51);
horz_line(325,FREQUENCY_BOX_POSITION-4,FREQUENCY_BOX_POSITION+51);
horz_line(458,FREQUENCY_BOX_POSITION-4,FREQUENCY_BOX_POSITION+51);
horz_line(459,FREQUENCY_BOX_POSITION-4,FREQUENCY_BOX_POSITION+51);
vert_line(FREQUENCY_BOX_POSITION-4,324,459);
vert_line(FREQUENCY_BOX_POSITION-3,324,459);
vert_line(FREQUENCY_BOX_POSITION+50,324,459);
vert_line(FREQUENCY_BOX_POSITION+51,324,459);

setcolor(panel_color);
outtextxy_dbg(FREQUENCY_BOX_POSITION+8,328,"451.3");
outtextxy_dbg(FREQUENCY_BOX_POSITION+8,336,"449.6");
outtextxy_dbg(FREQUENCY_BOX_POSITION+8,344,"448.0");
outtextxy_dbg(FREQUENCY_BOX_POSITION+8,352,"446.4");
outtextxy_dbg(FREQUENCY_BOX_POSITION+8,360,"444.8");
outtextxy_dbg(FREQUENCY_BOX_POSITION+8,368,"443.2");
outtextxy_dbg(FREQUENCY_BOX_POSITION+8,376,"441.6");
outtextxy_dbg(FREQUENCY_BOX_POSITION+8,384,"440.0");
outtextxy_dbg(FREQUENCY_BOX_POSITION+8,392,"438.4");
outtextxy_dbg(FREQUENCY_BOX_POSITION+8,400,"436.8");
outtextxy_dbg(FREQUENCY_BOX_POSITION+8,408,"435.3");
outtextxy_dbg(FREQUENCY_BOX_POSITION+8,416,"433.7");
outtextxy_dbg(FREQUENCY_BOX_POSITION+8,424,"432.1");
outtextxy_dbg(FREQUENCY_BOX_POSITION+8,432,"430.6");
outtextxy_dbg(FREQUENCY_BOX_POSITION+8,440,"429.0");
outtextxy_dbg(FREQUENCY_BOX_POSITION+8,448,"427.5");
place_filter_pointer();


/* Draw the filter response box */

draw_mode(panel_color);
horz_line(324,FILTER_BOX_POSITION-4,FILTER_BOX_POSITION+387);
horz_line(325,FILTER_BOX_POSITION-4,FILTER_BOX_POSITION+387);
horz_line(458,FILTER_BOX_POSITION-4,FILTER_BOX_POSITION+387);
horz_line(459,FILTER_BOX_POSITION-4,FILTER_BOX_POSITION+387);
vert_line(FILTER_BOX_POSITION-4,324,459);
vert_line(FILTER_BOX_POSITION-3,324,459);
```

```
    vert_line(FILTER_BOX_POSITION+386,324,459);
    vert_line(FILTER_BOX_POSITION+387,324,459);
}
    asm   mov ax,y1;
    asm   mov bx,ax;
    asm   shl ax,1;
    asm   shl ax,1;
    asm   add bx,ax;
    asm   add bx,gfx_scrnbase;
    asm   mov scrn_y1,bx;         // scrn_y1 = y1*5 + gfx_scrnbase

    asm   mov ax,y2;
    asm   mov bx,ax;
    asm   shl ax,1;
    asm   shl ax,1;
    asm   add bx,ax;
    asm   add bx,gfx_scrnbase;
    asm   mov scrn_y2,bx;         // scrn_y2 = y2*5 ÷ gfx_scrnbase

    if (gfx_mode == draw) {
       asm   mov ah,bitpiece;
       asm   mov cx,scrn_y1;
       asm   mov es,cx;
       asm   mov bx,scrn_x;
       asm   jmp line_start1;
    line_loop1:
       asm   or byte ptr es:[bx],ah;
       asm   add cx,5;
       asm   mov es,cx;
    line_start1:
       asm   cmp cx,scrn_y2;
       asm   jbe line_loop1;
    }

    else {
       asm   mov ah,bitpiece;
       asm   xor ah,255;
       asm   mov cx,scrn_y1;
       asm   mov es,cx;
       asm   mov bx,scrn_x;
       asm   jmp line_start2;
    line_loop2:
       asm   and byte ptr es:[bx],ah;
       asm   add cx,5;
       asm   mov es,cx;
    line_start2:
       asm   cmp cx,scrn_y2;
       asm   jbe line_loop2;
    }
}

void vert_bar(int x, int y1, int y2)
{
    /* Places a vertical bar on the graphics screen */

    unsigned int scrn_x, scrn_y1, scrn_y2;

    asm   mov ax,x;
    asm   shr ax,1;
    asm   shr ax,1;
    asm   shr ax,1;

                                                   gfx_scrnbase
    asm   mov scrn_y,bx;          // scrn_y = y*5 + gfx_scrnbase

    if (gfx_mode == draw)
       asm   mov ah,255;
    else
       asm   mov ah,0;
```

```
   asm   mov es,scrn_y;
   asm   mov bx,scrn_x1;

   asm   jmp line_start;
line_loop:
   asm   mov byte ptr es:[bx],ah;
line_start:
   asm   inc bx;
   asm   cmp bx,scrn_x2;
   asm   jb line_loop;

   if (gfx_mode == draw) {
      asm   mov ah,endpiece1;
      asm   mov bx,scrn_x1;
      asm   or byte ptr es:[bx],ah;
      asm   mov ah,endpiece2;
      asm   mov bx,scrn_x2;
      asm   or byte ptr es:[bx],ah;
   }
   else {
      asm   mov ah,endpiece1;
      asm   xor ah,255;
      asm   mov bx,scrn_x1;
      asm   and byte ptr es:[bx],ah;
      asm   mov ah,endpiece2;
      asm   xor ah,255;
      asm   mov bx,scrn_x2;
      asm   and byte ptr es:[bx],ah;
   }
}


void vert_line(int x, int y1, int y2)
{
   /* Places a vertical line on the graphics screen */

   unsigned int scrn_x, scrn_y1, scrn_y2;
   unsigned char bitpiece;

   asm   mov ax,x;
   asm   shr ax,1;
   asm   shr ax,1;
   asm   shr ax,1;
   asm   mov scrn_x,ax;          // scrn_x = x/8
   asm   shl ax,1;
   asm   shl ax,1;
   asm   shl ax,1;
   asm   mov bx,x;
   asm   sub bx,ax;
   asm   mov cl,bl;
   asm   mov ah,80h
   asm   shr ah,cl;
   asm   mov bitpiece,ah;
   asm   mov al,3;
   asm   out dx,ax;

   gfx_mode = erase;
}


void horz_line(int y, int x1, int x2)
{
   /* Places a horizontal line on the graphics screen */

   unsigned int scrn_y, scrn_x1, scrn_x2;
   unsigned char endpiece1, endpiece2;

   asm   mov ax,x1;
   asm   shr ax,1;
   asm   shr ax,1;
```

```
   asm   shr ax,1;
   asm   mov scrn_x1,ax;          // scrn_x1 = x1/8
   asm   shl ax,1;
   asm   shl ax,1;
   asm   shl ax,1;
   asm   mov bx,x1;
   asm   sub bx,ax;
   asm   mov cl,bl;
   asm   mov ah,0FFh;
   asm   shr ah,cl;
   asm   mov endpiece1,ah;

   asm   mov ax,x2;
   asm   shr ax,1;
   asm   shr ax,1;
   asm   shr ax,1;
   asm   mov scrn_x2,ax;          // scrn_x2 = x2/8
   asm   shl ax,1;
   asm   shl ax,1;
   asm   shl ax,1;
   asm   mov bx,x2;
   asm   sub bx,ax;
   asm   inc bx;
   asm   mov cl,bl;
   asm   mov ah,0FFh;
   asm   shr ah,cl;
   asm   xor ah,0FFh;
   asm   mov endpiece2,ah;

   asm   mov bx,scrn_x1;
   asm   cmp bx,scrn_x2;
   asm   jne and_skip;
   asm   and ah,endpiece1;
   asm   mov endpiece1,ah;
   asm   mov endpiece2,ah;
and_skip:

   asm   mov ax,y;
   asm   mov bx,ax;
   asm   shl ax,1;
   asm   shl ax,1;
   asm   add bx,ax;
   asm   add bx,gfx_scrnbase;

      asm   mov dx,3FBh;
      asm   mov al,old_lcr;
      asm   out dx,al;           // restore old contents of line control reg
   }

   if (graphics_initialized)
      closegraph();

   exit(errorcode);
}


void disable_serial_port()
{
   /* Disables the serial port interrupt */

   asm   in al,21h;
   asm   or al,010h;
   asm   out 21h,al;
}


void enable_serial_port()
{
   /* Re-enables the serial port interrupt */

   asm   in al,21h;
```

```
   asm   and al,0EFh;
   asm   out 21h,al;
}

void draw_mode(unsigned char color)
{
   /* Prepares the graphics controller to draw a particular color */

   asm   mov dx,3C4h;
   asm   mov ah,color;          // set the color
   asm   mov al,2;
   asm   out dx,ax;
   asm   mov dx,3CEh;
   asm   mov ah,16;             // 16 = draw mode
   asm   mov al,3;
   asm   out dx,ax;

   gfx_mode = draw;
}

void erase_mode(unsigned char color)
{
   /* Prepares the graphics controller to erase a particular color */

   asm   mov dx,3C4h;
   asm   mov ah,color;          // set the color
   asm   mov al,2;
   asm   out dx,ax;
   asm   mov dx,3CEh;
   asm   mov ah,8;              // 8 = erase mode

   asm   mov peak[si],dx;          // if (output > peak), peak = output

not_peak:
   asm   inc cl;
   asm   inc si;
   asm   inc si;
   asm   cmp cl,14;
   asm   jl note_loop;

   /* Increment the interrupt counter, which serves as a system clock */

filter_skip:
   interrupt_counter++;

   /* Finally, signal end-of-interrupt and restore system state */

   asm   mov al,20h;
   asm   out 20h,al;              // signal end-of-interrupt
   asm   popf;                    // restore flags register
   asm   pop di si dx cx bx ax;   // restore general registers
}

void finish(int errorcode)
{
   /* Prepares all data structures for program termination */

   if (comport_initialized) {
      asm   cli;                 // disable all interrupts

      asm   mov al,old_intmask;
      asm   out 21h,al;          // restore interrupt mask

      asm   mov dx,3F9h;
      asm   mov al,old_ier;
```

```
   asm    out dx,al;            // restore old contents of intrpt enable reg

   asm    mov dx,3FCh;
   asm    mov al,old_mcr;
   asm    out dx,al;            // restore old contents of modem control reg

   asm    sti;                  // enable all interrupts

   asm    mov dx,old_handler_off;
   asm    mov ax,old_handler_seg;
   asm    push ds;
   asm    mov ds,ax;
   asm    mov ax,250Ch;
   asm    int 21h;              // set interrupt 0Ch to call "old_handler"
   asm    pop ds;

   asm    mov dx,3F9h;
   asm    mov al,old_baud1;
   asm    out dx,al;            // restore old contents of baud rate divisor

   asm    mov dx,3F8h;
   asm    mov al,old_baud0;
   asm    out dx,al;            // restore old contents of baud rate divisor

         else if (i==6) strcpy(chord_name[i][j],"F#",;
         else if (i==7) strcpy(chord_name[i][j],"G");
         else if (i==8) strcpy(chord_name[i][j],"G#");
         else if (i==9) strcpy(chord_name[i][j],"A");
         else if (i==10) strcpy(chord_name[i][j],"A#");
         else if (i==11) strcpy(chord_name[i][j],"B");

         if (j==MAJ) strcat(chord_name[i][j],"");
         else if (j==MIN) strcat(chord_name[i][j],"m");
//       else if (j==SUS) strcat(chord_name[i][j],"sus");
         else if (j==DOM7) strcat(chord_name[i][j],"7");
         else if (j==MAJ7) strcat(chord_name[i][j],"maj7");
         else if (j==M6) strcat(chord_name[i][j],"m6");
         else if (j==M7) strcat(chord_name[i][j],"m7");
         else if (j==SUS7) strcat(chord_name[i][j],"7sus");
      }
   }

   strcpy(chord_name[15][15],"---");

   if ((handle = open(filename,O_CREAT|O_WRONLY|O_BINARY,
         S_IWRITE|S_IREAD)) == -1) {
      printf("Error opening file\n");
      exit(1);
   }
   if ((bytes = write(handle,chord_index,4096)) == -1) {
      printf("Write failed\n");
      exit(1);
   }
   if ((bytes = write(handle,chord_name,2048)) == -1) {
      printf("Write failed\n");
      exit(1);
   }
   close(handle);
}

void index_chord(unsigned char index, unsigned int structure)
{
   asm    mov al,index;
   asm    mov bx,structure;

chord_loop:
   asm    mov byte ptr chord_index[bx],al;
   asm    shl bx,1;
```

```
   asm   cmp bx,0001000000000000b;
   asm   jb cycle_skip;
   asm   and bx,0000111111111111b;
   asm   inc bx;
cycle_skip:
   asm   add al,16;
   asm   cmp al,0C0h;
   asm   jb chord_loop;
}

/* MKCHORD.CPP:  Generates the file containing the chord constants used by
                 SCRIPT.CPP */

#pragma inline

#include <fcntl.h>
#include <io.h>
#include <stdlib.h>
#include <stdio.h>
#include <string.h>
#include <sys\stat.h>

#define NO_CHORD 255
#define MAJ 0
#define MIN 1
#define SUS 2
#define DOM7 3
#define MAJ7 4
#define M6 5
#define M7 6
#define SUS7 7


unsigned char chord_index[4096];
char chord_name[16][16][8];


void index_chord(unsigned char index, unsigned int structure);


main()
{
   int i,j;
   int handle,bytes;
   char *filename = "CONST\\CHORD.BIN";

   for (i=0;i<4096;i++)
      chord_index[i] = NO_CHORD;

   for (i=0;i<16;i++)
      for (j=0;j<16;j++)
         strcpy(chord_name[i][j],"");

   index_chord(MAJ, 0x091); // 0000 1001 0001b
   index_chord(MIN, 0x089); // 0000 1000 1001b
// index_chord(SUS, 0x0A1); // 0000 1010 0001b
   index_chord(DOM7,0x491); // 0100 1001 0001b
   index_chord(MAJ7,0x891); // 1000 1001 0001b
   index_chord(M6,  0x289); // 0010 1000 1001b
   index_chord(M7,  0x489); // 0100 1000 1001b
   index_chord(SUS7,0x4A1); // 0100 1010 0001b

   for (i=0;i<12;i++) {
      for (j=0;j<16;j++) {
         if (i==0) strcpy(chord_name[i][j],"C");
         else if (i==1) strcpy(chord_name[i][j],"C#");
         else if (i==2) strcpy(chord_name[i][j],"D");
         else if (i==3) strcpy(chord_name[i][j],"D#");
         else if (i==4) strcpy(chord_name[i][j],"E");
         else if (i==5) strcpy(chord_name[i][j],"F");
```

```
   errorcode = 1;

   if ((bytes = write(handle,&last_page_number,sizeof last_page_number)) ==-1)
      goto error;

   for (i=0;i<=last_page_number;i++) {
      movedata(FP_SEG(&chord_transcription[i][0][0]),
               FP_OFF(&chord_transcription[i][0][0]),
               FP_SEG(chord_buffer),
               FP_OFF(chord_buffer),
               MAX_LINES*MAX_COLUMNS);
      if ((bytes = write(handle,chord_buffer,MAX_LINES*MAX_COLUMNS)) == -1)
         goto error;

      movedata(FP_SEG(&comment_transcription[i][0][0]),
               FP_OFF(&comment_transcription[i][0][0]),
               FP_SEG(comment_buffer),
               FP_OFF(comment_buffer),
               MAX_LINES*MAX_COMMENTS);
      if ((bytes = write(handle,comment_buffer,MAX_LINES*MAX_COMMENTS)) == -1)
         goto error;
   }

   close(handle);
   strcpy(title,strupr(filename));

done:
   display_page();
   return;

error:
   close(handle);
   erase_mode(all_colors);
   fill_rect(0,128,639,135);
   setcolor(message_color);
   if (errorcode == 0)
     outtextxy_dbg(128,128,"Error opening file.  Press any key to continue.");
   else if (errorcode == 1)
      outtextxy_dbg(152,128,"Write failed.  Press any key to continue.");
   beep();
   while (!kbhit());
   keystroke = getch();
   if (keystroke == 0)
      getch();
   display_page();
}


void get_string(int x, int y, char *str)
{
   /* Gets a string from the user on the graphics screen */

   char edit_str[16];
   int i;
   char keystroke;

   strcpy(edit_str,"               ");
   i = 0;
      if (k>=0) {
         filename[12] = 'S';
         filename[13] = k+48;
      }
      else {
         filename[12] = 'F';
         filename[13] = -k+48;
      }

      if ((handle = open(filename,O_CREAT|O_WRONLY|O_BINARY,
            S_IWRITE|S_IREAD)) == -1) {
         printf("Error opening file\n");
         exit(1);
```

```
        }
        if ((bytes = write(handle,AH_PRODUCT,7168)) == -1) {
           printf("Write failed\n");
           exit(1);
        }
        if ((bytes = write(handle,AL_PRODUCT,7168)) == -1) {
           printf("Write failed\n");
           exit(1);
        }
        if ((bytes = write(handle,BH_PRODUCT,7168)) == -1) {
           printf("Write failed\n");
           exit(1);
        }
        if ((bytes = write(handle,BL_PRODUCT,7168)) == -1) {
           printf("Write failed\n");
           exit(1);
        }
        if ((bytes = write(handle,C_PRODUCT,7168)) == -1) {
           printf("Write failed\n");
           exit(1);
        }
        close(handle);
     }
}

long round(double d)
{
   long l;
   char sign;

   if (d>=0) sign = 1; else sign = -1;
   d = d*sign;
   d = d+0.5;
   l = d;
   l = l*sign;
   return l;
}

/* MKFILTER.CPP:  Generates the files containing the filter constants used by
                  SCRIPT.CPP */

#include <fcntl.h>
#include <io.h>
#include <math.h>
#include <stdlib.h>
#include <stdio.h>
#include <sys\stat.h>

#define PI 3.141592654
#define TWO_PI 6.283185308
#define MAX_FILTER_FREQ 523.2511306
#define SAMPLING_FREQ 4800.0
#define Q 40.0


int AH_PRODUCT[14][256], AL_PRODUCT[14][256];
int BH_PRODUCT[14][256], BL_PRODUCT[14][256];
int C_PRODUCT[14][256];


long round(double d);


main()
{
   double F,A,B,C,factor,j_double,k_double;
   int i,j,k;
   int handle,bytes;
   char *filename = "CONST\\FILTERxx.BIN";
```

```
for (k=-8;k<8;k++) {
   k_double = k;
   for (j=0;j<14;j++) {
      j_double = j-1;
      F = pow(2.0,((j_double/12.0)+(k_double/192.0)))
         *MAX_FILTER_FREQ/SAMPLING_FREQ;
      A = 2.0*cos(TWO_PI*F)*exp(-PI*F/Q);
      B = exp(-TWO_PI*F/Q);
      C = cos(PI*F)*sqrt(1.0-A+B)/Q;

      for (i=0;i<256;i++) {
         if (i<128)
            factor = 256*i;
         else
            factor = 256*(i-256);
         AH_PRODUCT[j][i] = round(factor*A);
         BH_PRODUCT[j][i] = round(factor*B);
         factor = i;
         AL_PRODUCT[j][i] = round(factor*A);
         BL_PRODUCT[j][i] = round(factor*B);
         if (i<128)
            factor = 128*i;
         else
            factor = 128*(i-256);
         C_PRODUCT[j][i] = round(factor*C);
      }
   }

   while(TRUE) {
      while (!kbhit());
      keystroke = getch();
      if (keystroke == 0)
         getch();
      if ((keystroke >= 33) && (keystroke <= 126) && (i < 12)) {
         edit_str[i] = keystroke;
         i++;
         outtextxy_dbg(x,y,edit_str);
      }
      else if ((keystroke == BACKSPACE) && (i > 0)) {
         i--;
         edit_str[i] = ' ';
         erase_mode(all_colors);
         fill_rect(x+i*8,y,x+i*8+7,y+7);
      }
      else if (keystroke == ESC) {
         strcpy(str,"");
         return;
      }
      else if (keystroke == ENTER) {
         strcpy(str,edit_str);
         return;
      }
      else {
         beep();
      }
   }
}

                                 filename
   strcpy(title,strupr(fi.ename));

done:
   display_page();
   return;

error:
   close(handle);
   erase_mode(all_colors);
   fill_rect(0,128,639,135);
   setcolor(message_color);
```

```
   if (errorcode == 0)
     outtextxy_dbg(128,128,"Error opening file.  Press any key to continue.");
   else if (errorcode == 1)
      outtextxy_dbg(160,128,"Read failed.  Press any key to continue.");
   beep();
   while (!kbhit());
   keystroke = getch();
   if (keystroke == 0)
      getch();
   page_number = 0;
   last_page_number = 0;
   for (i=0;i<MAX_LINES;i++) {
      for (j=0;j<MAX_COLUMNS;j++)
         chord_transcription[0][i][j] = NO_CHORD;
      for (j=0;j<MAX_COMMENTS;j++)
         comment_transcription[0][i][j] = 0;
   }
   strcpy(title,"");
   display_page();
}

void write_chord_file()
{
   /* Writes to disk a transcribed progression of chords */

   int handle,bytes;
   char pathname[32], filename[16];
   int errorcode;
   int i;
   unsigned char chord_buffer[MAX_LINES][MAX_COLUMNS];
   char comment_buffer[MAX_LINES][MAX_COMMENTS];
   char keystroke;

   strcpy(pathname,"FILES\\");
   errorcode = 0;

   erase_mode(all_colors);
   fill_rect(0,0,639,319);
   setcolor(message_color);
   outtextxy_dbg(192,128,"File to write:");
   setcolor(hilite_color);
   get_string(320,128,filename);
   if (strcmpi(filename,"") == 0)
      goto done;
   strcat(pathname, filename);
   if ((handle = open(pathname,O_WRONLY|O_CREAT|O_TRUNC|O_BINARY,
         S_IWRITE|S_IREAD)) == -1)
      goto error;

      }
   }
}

void read_chord_file()
{
   /* Reads from disk a transcribed progression of chords */

   int handle,bytes;
   char pathname[32], filename[16];
   int errorcode;
   int i,j;
   unsigned char chord_buffer[MAX_LINES][MAX_COLUMNS];
   char comment_buffer[MAX_LINES][MAX_COMMENTS];
   char keystroke;

   strcpy(pathname,"FILES\\");
   errorcode = 0;
```

```
erase_mode(all_colors);
fill_rect(0,0,639,319);
setcolor(message_color);
outtextxy_dbg(200,128,"File to read:");
setcolor(hilite_color);
get_string(320,128,filename);
if (strcmpi(filename,"") == 0)
   goto done;
strcat(pathname, filename);
if ((handle = open(pathname,O_RDONLY|O_BINARY,S_IWRITE|S_IREAD)) == -1)
   goto error;

errorcode = 1;

if ((bytes = read(handle,&last_page_number,sizeof last_page_number)) == -1)
   goto error;

if ((last_page_number < 0) || (last_page_number >= MAX_PAGES))
   goto error;

for (i=0;i<=last_page_number;i++) {
   if ((bytes = read(handle,chord_buffer,MAX_LINES*MAX_COLUMNS)) == -1)
      goto error;
   movedata(FP_SEG(chord_buffer),
            FP_OFF(chord_buffer),
            FP_SEG(&chord_transcription[i][0][0]),
            FP_OFF(&chord_transcription[i][0][0]),
            MAX_LINES*MAX_COLUMNS);

   if ((bytes = read(handle,comment_buffer,MAX_LINES*MAX_COMMENTS)) == -1)
      goto error;
   movedata(FP_SEG(comment_buffer),
            FP_OFF(comment_buffer),
            FP_SEG(&comment_transcription[i][0][0]),
            FP_OFF(&comment_transcription[i][0][0]),
            MAX_LINES*MAX_COMMENTS);
}

close(handle);
page_number = 0;

                                      line
                         (line_number*LINE_HEIGHT+
                            chord_height[current_chord_family]+2),
                         (line_number*LINE_HEIGHT+
                            chord_height[current_chord_family]+4));
         }
      }
   }

   for (comment_line_number=0; comment_line_number<MAX_LINES;
        comment_line_number++) {
      for (comment_column_number=0; comment_column_number<MAX_COMMENTS;
           comment_column_number++) {
         if (comment_transcription[page_number][comment_line_number]
                                  [comment_column_number] != 0) {
            strcpy(comment_string," ");
            comment_string[0] = comment_transcription[page_number]
               [comment_line_number][comment_column_number];
            setcolor(comment_color);
            outtextxy_dbg(CHORD_BOX_POSITION+
                             comment_column_number*COMMENT_WIDTH,
                          comment_line_number*LINE_HEIGHT+16,comment_string);
         }
      }
   }

   fix_delay();
}
```

```
void new_page()
{
   /* Draws a blank page */

   char page_string[8];
   char chord_string[4];
   int i,j;

   erase_mode(all_colors);
   fill_rect(0,0,639,319);

   setcolor(hilite_color);
   outtextxy_dbg(0,0,title);

   strcpy(page_string,"----");
   page_string[1] = (page_number+1)/10 + 48;
   page_string[2] = (page_number+1)%10 + 48;
   if (page_string[1] == '0') {
      page_string[0] = ' ';
      page_string[1] = '-';
   }
   setcolor(page_color);
   outtextxy_dbg(304,0,page_string);

   for (i=0;i<MAX_LINES;i++) {
      for (j=0;j<12;j++) {
         strcpy(chord_string, &note_name[j][0]);
         setcolor(chord_color[j]);
         outtextxy_dbg((CHORD_BOX_POSITION-8*strlen(chord_string)),
                        (i*LINE_HEIGHT+chord_height[j]),
                        chord_string);

   for (i=0;i<COLUMN_WIDTH;i++) {
      if (current_chord_type == 0)
         vert_line((CHORD_BOX_POSITION+column_number*COLUMN_WIDTH+i),
                   (line_number*LINE_HEIGHT+
                      chord_height[current_chord_family]),
                   (line_number*LINE_HEIGHT+
                      chord_height[current_chord_family]+6));
      else if (current_chord_type == 1)
         vert_line((CHORD_BOX_POSITION+column_number*COLUMN_WIDTH+i),
                   (line_number*LINE_HEIGHT+
                      chord_height[current_chord_family]+2),
                   (line_number*LINE_HEIGHT+
                      chord_height[current_chord_family]+4));
   }

   column_number++;
   if (column_number >= MAX_COLUMNS) {
      column_number = 0;
      line_number++;
      if (line_number >= MAX_LINES) {
         line_number = 0;
         page_number++;
         if (page_number >= MAX_PAGES) {
            page_number = MAX_PAGES-1;
            end_transcription();
         }
      }
   }
}

void display_page()
{
   /* Displays a page of transcribed music */

   unsigned char current_chord_index;
   unsigned char current_chord_family, current_chord_type;
   int i;
```

```
   char comment_string[4];

   new_page();

   for (line_number=0; line_number<MAX_LINES; line_number++) {
      for (column_number=0; column_number<MAX_COLUMNS; column_number++) {

         current_chord_index = chord_transcription[page_number][line_number]
                                                  [column_number];
         current_chord_family = (current_chord_index >> 4);
         current_chord_type = (current_chord_index & 15);

         draw_mode(chord_color[current_chord_family]);
         for (i=0;i<COLUMN_WIDTH;i++) {
            if (current_chord_type == 0)
               vert_line((CHORD_BOX_POSITION+column_number*COLUMN_WIDTH+i),
                         (line_number*LINE_HEIGHT+
                            chord_height[current_chord_family]),
                         (line_number*LINE_HEIGHT+
                            chord_height[current_chord_family]+6));
            else if (current_chord_type == 1)
               vert_line((CHORD_BOX_POSITION+column_number*COLUMN_WIDTH+i),
```

```
void transcribe_chord()
{
   /* Displays the name of the chord currently being played */

   char trans_msg[16];
   int i,j;
   boolean note_on[12];
   long max_sum;
   int max_j;
   int chord_structure[3];
   unsigned int chord_structure_word;
   unsigned char current_chord_index;
   unsigned char current_chord_family, current_chord_type;

   if ((line_number == 0) && (column_number == 0)) {
      new_page();
      strcpy(trans_msg,"Transcribing");
      setcolor(message_color);
      outtextxy_dbg(544,0,trans_msg);
      fix_delay();

      comment_column_number = 0;
      comment_line_number = 0;
      new_comment = TRUE;
   }

   for (i=0;i<12;i++)
      note_on[i] = FALSE;

   for (i=0;i<3;i++) {
      max_sum = 0;
      max_j = -1;

      for (j=0;j<12;j++) {
         if ((note_family_sum[j] > max_sum) &&
             (note_on[j] == FALSE)) {
            max_sum = note_family_sum[j];
            max_j = j;
         }
      }

      chord_structure[i] = max_j;
      note_on[max_j] = TRUE;
   }

   chord_structure_word = 0;
```

```
for (i=0;i<3;i++) {
   if (chord_structure[i] != -1)
      chord_structure_word += (1 << chord_structure[i]);
}

current_chord_index = chord_index[chord_structure_word];
current_chord_family = (current_chord_index >> 4);
current_chord_type = (current_chord_index & 15);

chord_transcription[page_number][line_number][column_number] =
   current_chord_index;

draw_mode(chord_color[current_chord_family]);

   for (i=0;i<5;i++) {
      signal_amplitude[i] = 0;
      signal_cutoff[i] = 0;
   }
}


void place_filter_pointer()
{
   /* Places an arrow on the graphics screen pointing to the current filter
      frequency */

   char arrow_string[4];

   strcpy(arrow_string," ");
   arrow_string[0] = RIGHT_ARROW;
   outtextxy_dbg(FREQUENCY_BOX_POSITION,384-filter_set*8,arrow_string);
}


void begin_transcription()
{
   /* Begins a transcription */

   int i,j,k;

   transcription_mode = trans_on;
   page_number = 0;
   line_number = 0;
   column_number = 0;
   comment_line_number = 0;
   comment_column_number = 0;
   new_comment = TRUE;

   for (i=0;i<MAX_PAGES;i++) {
      for (j=0;j<MAX_LINES;j++) {
         for (k=0;k<MAX_COLUMNS;k++)
            chord_transcription[i][j][k] = NO_CHORD;
         for (k=0;k<MAX_COMMENTS;k++)
            comment_transcription[i][j][k] = 0;
      }
   }

   strcpy(title,"");

   fix_delay();
}


void end_transcription()
{
   /* Terminates a transcription */

   transcription_mode = trans_off;
   last_page_number = page_number;
   display_page();
}
```

```
   asm   add bx,ax;
   asm   add bx,gfx_scrnbase;
   asm   mov scrn_y1,bx;         // scrn_y1 = y1*5 + gfx_scrnbase

   asm   mov ax,y2;
   asm   mov bx,ax;
   asm   shl ax,1;
   asm   shl ax,1;
   asm   add bx,ax;
   asm   add bx,gfx_scrnbase;
   asm   mov scrn_y2,bx;         // scrn_y2 = y2*5 + gfx_scrnbase

   if (gfx_mode == draw)
      asm   mov ah,255;
   else
      asm   mov ah,0;

   asm   mov cx,scrn_y1;
   asm   mov es,cx;
   asm   mov bx,scrn_x1;

fill_loop:
   asm   mov byte ptr es:[bx],ah;
   asm   inc bx;
   asm   cmp bx,scrn_x2;
   asm   jbe fill_loop;
   asm   mov bx,scrn_x1;
   asm   add cx,5;
   asm   mov es,cx;
   asm   cmp cx,scrn_y2;
   asm   jbe fill_loop;
}


void outtextxy_dbg(int x, int y, char *textstring)
{
   /* Does what "outtextxy()" should do */

   outtextxy(0,0," ");
   outtextxy(x,y,textstring);
   outtextxy(0,0," ");
}


void beep()
{
   /* Beeps */

   sound(1000);
   delay(10);
   nosound();
   fix_delay();
}


void fix_delay()
{
   /* Resets signal monitors, which become skewed by delays */

   int i;

   asm   mov scrn_x,ax;          // scrn_x = x/8

   asm   mov ax,y1;
   asm   mov bx,ax;
   asm   shl ax,1;
   asm   shl ax,1;
   asm   add bx,ax;
   asm   add bx,gfx_scrnbase;
   asm   mov scrn_y1,bx;         // scrn_y1 = y1*5 + gfx_scrnbase
```

```
   asm   mov ax,y2;
   asm   mov bx,ax;
   asm   shl ax,1;
   asm   shl ax,1;
   asm   add bx,ax;
   asm   add bx,gfx_scrnbase;
   asm   mov scrn_y2,bx;          // scrn_y2 = y2*5 + gfx_scrnbase

   if (gfx_mode == draw)
      asm   mov ah,255;
   else
      asm   mov ah,0;

   asm   mov cx,scrn_y1;
   asm   mov es,cx;
   asm   mov bx,scrn_x;

   asm   jmp bar_start;
bar_loop:
   asm   mov byte ptr es:[bx],ah;
   asm   add cx,5;
   asm   mov es,cx;
bar_start:
   asm   cmp cx,scrn_y2;
   asm   jbe bar_loop;
}


void fill_rect(int x1, int y1, int x2, int y2)
{
   /* Fills a rectangular region of the graphics screen */

   unsigned int scrn_x1, scrn_x2, scrn_y1, scrn_y2;

   asm   mov ax,x1;
   asm   shr ax,1;
   asm   shr ax,1;
   asm   shr ax,1;
   asm   mov scrn_x1,ax;          // scrn_x1 = x1/8

   asm   mov ax,x2;
   asm   shr ax,1;
   asm   shr ax,1;
   asm   shr ax,1;
   asm   mov scrn_x2,ax;          // scrn_x2 = x2/8

   asm   mov ax,y1;
   asm   mov bx,ax;
   asm   shl ax,1;
   asm   shl ax,1;
```

What is claimed is:

1. A device for the real-time extraction and display of musical chord sequences from an audio signal, comprising input means for receiving the audio signal;

analog-to-digital conversion means for converting the audio signal to digital data on a periodic basis;

pitch detection means for detecting in real time all pitches within a predetermined frequency range contained in the audio signal, the pitch detection means including digital filter means for isolating individual note pitches within a predetermined pitch range, the digital filter means comprising a bank of digital band-pass filters receiving the digital data as an input, and amplitude detection means for determining the amplitude of the output of each of the digital band-pass filters, the amplitude detection means including amplitude comparison means for comparing the amplitudes of the outputs of adjacent filters;

chord determining means for determining musical chords characterized by the detected pitches, the chord determining means including means for detecting a distribution pattern characterized by the amplitudes of the detected pitches; and pattern comprised means for comparing the detected distribution pattern to chord patterns and selecting the chord pattern which best matches the distribution pattern; and output means for displaying the chords determined by the chord determining means.

2. A device according to claim 1, further comprising analog band-pass filter means for dividing the audio signal into separate octave-range component signals, and in which the analog-to-digital conversion means includes sampling means for sampling each component signal, the sampling means including means for providing a different sampling interval for each component signal, the sampling rate of higher octave-range component signals being greater than that of lower octave-range component signals.

3. A device according to claim 2, wherein the number of component signals provided by the analog band-pass filter means is four and the analog-to-digital conversion means further includes means for selecting component signals as follows:

4, 3, 4, 2, 4, 3, 4, 1, 4, 3, 4, 2, 4, 3, 4, X where the component signals are numbered one through four from lowest to highest octave range and where X indicates that no component signal is selected.

4. A device according to claim 1 further including means for serially transmitting the digital data, such means including multiplexing means for multiplexing the digital data;

serial port output means for outputting the multiplexed digital data;

serial port input means for receiving as an input the multiplexed digital data;

demultiplexing means for demultiplexing the multiplexed digital data.

5. A device according to claim 1 wherein the input means includes means for receiving a two-channel signal and adding the two channels together into a single channel.

6. A device according to claim 1, further including:

amplitude detection means for determining the amplitude of the audio input signal;

amplitude comparison means for determining the difference between the detected amplitude and a predetermined amplitude;

means for displaying the results of the comparison performed by the amplitude comparison means.

7. A device according to claim 13, further including amplifier means for amplifying the audio input signal; means for varying the gain of the amplifier means.

8. A device according to claim 1, wherein the amplitude comparison means further includes means for determining the output amplitudes of three filters: the filter with the greatest amplitude and the two filters adjacent to it;

deviation computing means for calculating and providing as an output the deviation, implied by the relative amplitudes of the three filters, of pitches in the input signal from the frequencies of the digital filters; and means for displaying the output of the deviation computing means.

9. A device according to claim 1, further including means for adjusting the periodic basis on which the audio input signal is converted to digital data, including means for receiving a user input indicative of the desired periodic basis.

10. An apparatus according to claim 1, wherein the means for detecting a distribution pattern includes:

averaging means for determining the average amplitudes of pitches separated by whole-octave multiples; and means for determining the pitches with the largest average amplitudes and their distribution pattern;

and wherein the pattern comparison means includes means for comparing the distribution pattern of the pitches with the greatest amplitudes to chord patterns and selecting the chord pattern which best matches the distribution pattern.

11. A method for the real-time extraction and display of musical chord sequences from an audio signal, comprising:

(a) receiving an audio signal as an input;

(b) converting the audio signal to digital data on a periodic basis;

(c) detecting in real time all pitches within a predetermined frequency range contained in the audio signal and the amplitudes of the detected pitches by providing a bank of digital band-pass filters for isolating individual note pitches within a predetermined pitch range, determining the amplitude of the output of each of the digital band-pass filters, and comparing the amplitudes of the output of adjacent filters;

(d) detecting a distribution pattern characterized by the amplitudes of the detected pitches:

(e) comparing the detected distribution pattern to chord patterns;

(f) selecting a chord pattern which best matches the distribution pattern;

(g) displaying the chord corresponding to the selected chord pattern.

12. A method according to claim 11, wherein there is included between steps (a) and (b):

dividing the audio signal into separate octave-range component signals and where step (b) includes:

converting each divided octave-range component signal into digital data.

13. A method according to claim 12, wherein there is included between steps (b) and (c):

sampling each octave-range component signal at regular intervals and converting each sample into digital data; and providing a different sampling interval for each octave-range component signal, the sampling rate of higher octave-range signals being greater than that of lower octave-range signals.

14. A method according to claim 13, wherein the step of dividing the analog signal into separate octave-range components signals includes dividing the analog signal into four separate octave-range component signals, and the step of sampling each octave-range component signal at regular intervals includes:

selecting octave ranges as follows:

4, 3, 4, 2, 4, 3, 4, 1, 4, 3, 4, 2, 4, 3, 4, X where the octave ranges are numbered one through four from lower to highest frequency and where X indicates that no octave is selected.

* * * * *

UNITED STATES PATENT AND TRADEMARK OFFICE

CERTIFICATE OF CORRECTION

PATENT NO. : 5,440,756

DATED : August 8, 1995

INVENTOR(S) : Bruce E. Larson

It is certified that error appears in the above-identified patent and that said Letters Patent is hereby corrected as shown below:

Col. 2, line 37: "the range Of note volumes" should read -- the range of note volumes --

Col. 10, line 24: "C: SCRIPT FILES" should read -- C:\SCRIPT\FILES --

Col. 70, line 59: "pattern comprised means" should read -- pattern comparison means --

Col. 71, line 41: "A device according to claim 13" should read -- A device according to claim 6 --

In addition, the section of the patent entitled "APPENDIX," col. 9, line 31 - col. 70, line 49, should be deleted, and the attached "APPENDIX" substituted therefor.

Signed and Sealed this

Thirtieth Day of January, 1996

*Attest:*

BRUCE LEHMAN

*Attesting Officer*

*Commissioner of Patents and Trademarks*

APPENDIX

PROGRAM SOURCE CODE

```
/* SCRIPT.CPP:  Analyzes an audio-frequency signal to determine its musical
                components */

#pragma inline

#include <conio.h>
#include <dos.h>
#include <fcntl.h>
#include <graphics.h>
#include <io.h>
#include <stdio.h>
#include <stdlib.h>
#include <string.h>
#include <sys\stat.h>

#define FALSE 0
#define TRUE 1
#define CTRL_B 2
#define CTRL_E 5
#define CTRL_F 6
#define CTRL_N 14
#define CTRL_R 18
#define CTRL_W 23
#define CTRL_X 24
#define BACKSPACE 8
#define ENTER 13
#define ESC 27
#define SPACE 32
#define HOME 71
#define UP 72
#define PG_UP 73
#define LEFT 75
#define RIGHT 77
#define END 79
#define DOWN 80
#define PG_DN 81
#define RIGHT_ARROW 26
#define LEFT_ARROW 27
#define PRODUCT_SIZE 35840     /* total size of "product" data structure, to be
                                  loaded from disk */
#define CHORD_INDEX_SIZE 4096 /* total size of "chord_index" data structure,
                                  to be loaded from disk */
#define CHORD_NAME_SIZE 2048  /* total size of "chord_name" data structure, to
                                  be loaded from disk */
#define GFX_SCRNBASE 40960    /* base address of graphics screen */
#define COMPORT 0             /* serial port number */
#define INTERRUPT_FREQ 4800   /* frequency of serial port interrupt */
#define SAMPLING_PERIOD 24    /* number of interrupt cycles alotted to sample
                                  one octave of filters.  Thus, the output of
                                  each filter is sampled at a rate of:
                                  INTERRUPT_FREQ/
                                           (SAMPLING_PERIOD*2^(5-octave#)) */
#define FILTER_BAR_RATIO 128  /* ratio of filter response to bar height */
#define NOISE_LEVEL_INIT 256  /* amplitude below which a filter response is
                                  considered to be noise (initial setting) */
#define SIGNAL_BOX_POSITION 8        /* horizontal position of signal box */
#define INTONATION_BOX_POSITION 88   /* horizontal position of intonation box*/
#define FREQUENCY_BOX_POSITION 144   /* horizontal position of frequency box */
#define FILTER_BOX_POSITION 248      /* horizontal position of filter box */
#define CHORD_BOX_POSITION 64        /* horizontal position of chord box */
```

```
#define MAX_PAGES 99          /* maximum number of transcribed pages */
#define MAX_LINES 2           /* maximum number of lines per page */
#define LINE_HEIGHT 160       /* height of each line */
#define MAX_COLUMNS 144       /* maximum number of columns per line */
#define COLUMN_WIDTH 4        /* width of each column */
#define MAX_COMMENTS 72       /* maximum number of comments per line */
#define COMMENT_WIDTH 8       /* width of each comment */
#define NO_CHORD 255          /* chord index for unrecognized chord */

typedef char boolean;

int octave[32];
char signal_amplitude[5], signal_cutoff[5];
int r0[5][14], r1[5][14], r2[5][14], output[5][14], peak[5][14];
boolean filter_active[5][12];
char note_name[12][4];
long note_family_sum[12];
unsigned char far chord_transcription[MAX_PAGES][MAX_LINES][MAX_COLUMNS]
char far comment_transcription[MAX_PAGES][MAX_LINES][MAX_COMMENTS];
unsigned char chord_color[16];
int chord_height[16];
char title[16];
int product[5][14][256];
unsigned char chord_index[4096];
char chord_name[256][8];
unsigned char old_lcr, old_baud0, old_baud1;
unsigned int old_handler_off, old_handler_seg;
unsigned char old_mcr, old_ier, old_intmask;

unsigned int gfx_scrnbase = GFX_SCRNBASE;
int comport = COMPORT;
boolean graphics_initialized = FALSE;
boolean comport_initialized = FALSE;
long interrupt_counter = 0;
long clock = 0;
long old_clock = 0;
int filter_octave_index = 0;
int display_octave_index = 0;
int filter_set = 0;
int noise_level = NOISE_LEVEL_INIT;
int filter_max = 0;
int filter_max_left = 0;
int filter_max_right = 0;
int page_number = 0;
int line_number = 0;
int column_number = 0;
int comment_line_number = 0;
int comment_column_number = 0;
int last_page_number = 0;
boolean new_comment = TRUE;
enum {absolute, relative} display_mode = relative;
enum {edit_off, filter_freq, noise_lev} edit_mode = edit_off;
enum {trans_off, trans_on} transcription_mode = trans_off;
enum {draw, erase} gfx_mode = draw;
unsigned char background_color = BLACK;
unsigned char panel_color = RED;
unsigned char cutoff_bar_color = MAGENTA;
unsigned char sharp_bar_color = MAGENTA;
```

```
unsigned char flat_bar_color = RED;
unsigned char filter_bar_color = LIGHTMAGENTA;
unsigned char hilite_color = YELLOW;
unsigned char note_color = YELLOW;
unsigned char comment_color = YELLOW;
unsigned char message_color = LIGHTRED;
unsigned char page_color = YELLOW;
unsigned char all_colors = WHITE;


void init();
void init_filter_constants();
void init_chord_constants();
void init_graphics();
void init_comport();
void main_loop();
void get_command();
void update_screen();
void far interrupt serial_handler();
void finish(int errorcode);

void disable_serial_port();
void enable_serial_port();
void draw_mode(unsigned char color);
void erase_mode(unsigned char color);
void horz_line(int y, int x1, int x2);
void vert_line(int x, int y1, int y2);
void vert_bar(int x, int y1, int y2);
void fill_rect(int x1, int y1, int x2, int y2);
void outtextxy_dbg(int x, int y, char *textstring);
void beep();
void fix_delay();
void place_filter_pointer();
void begin_transcription();
void end_transcription();
void transcribe_chord();
void display_page();
void new_page();
void read_chord_file();
void write_chord_file();
void get_string(int x, int y, char *str);


void main()
{
   init();
   main_loop();
}


void init()
{
   /* Initializes all global structures */

   int i,j,k;

   for (i=0;i<32;i+=2) octave[i] = 4;
   for (i=1;i<32;i+=4) octave[i] = 3;
   for (i=3;i<32;i+=8) octave[i] = 2;
   for (i=7;i<32;i+=16) octave[i] = 1;
```

```
for (i=15;i<32;i+=32) octave[i] = 0;
octave[31] = -1;

for (i=0;i<5;i++) {
   signal_amplitude[i] = 0;
   signal_cutoff[i] = 0;
   for (j=0;j<14;j++) {
      r0[i][j] = 0;
      r1[i][j] = 0;
      r2[i][j] = 0;
      output[i][j] = 0;
      peak[i][j] = 0;
   }
   for (j=0;j<12;j++)
      filter_active[i][j] = FALSE;
}

strcpy(&note_name[0][0],"C");
strcpy(&note_name[1][0],"C#");
strcpy(&note_name[2][0],"D");
strcpy(&note_name[3][0],"D#");
strcpy(&note_name[4][0],"E");
strcpy(&note_name[5][0],"F");
strcpy(&note_name[6][0],"F#");
strcpy(&note_name[7][0],"G");
strcpy(&note_name[8][0],"G#");
strcpy(&note_name[9][0],"A");
strcpy(&note_name[10][0],"A#");
strcpy(&note_name[11][0],"B");

for (i=0;i<12;i++)
   note_family_sum[i] = 0;

for (i=0;i<MAX_PAGES;i++) {
   for (j=0;j<MAX_LINES;j++) {
      for (k=0;k<MAX_COLUMNS;k++)
         chord_transcription[i][j][k] = NO_CHORD;
      for (k=0;k<MAX_COMMENTS;k++)
         comment_transcription[i][j][k] = 0;
   }
}

chord_color[0] = LIGHTGREEN;
chord_color[1] = LIGHTCYAN;
chord_color[2] = LIGHTBLUE;
chord_color[3] = LIGHTMAGENTA;
chord_color[4] = LIGHTRED;
chord_color[5] = YELLOW;
chord_color[6] = LIGHTGREEN;
chord_color[7] = LIGHTCYAN;
chord_color[8] = LIGHTBLUE;
chord_color[9] = LIGHTMAGENTA;
chord_color[10] = LIGHTRED;
chord_color[11] = YELLOW;
chord_color[12] = LIGHTGRAY;
chord_color[13] = LIGHTGRAY;
chord_color[14] = LIGHTGRAY;
chord_color[15] = LIGHTGRAY;

chord_height[0] = 24;
```

```
    chord_height[1] = 80;
    chord_height[2] = 40;
    chord_height[3] = 96;
    chord_height[4] = 56;
    chord_height[5] = 112;
    chord_height[6] = 72;
    chord_height[7] = 32;
    chord_height[8] = 88;
    chord_height[9] = 48;
    chord_height[10] = 104;
    chord_height[11] = 64;
    chord_height[12] = 120;
    chord_height[13] = 120;
    chord_height[14] = 120;
    chord_height[15] = 120;

    strcpy(title,"");

    init_filter_constants();
    init_chord_constants();
    init_graphics();
    init_comport();
}


void init_filter_constants()
{
    /* Loads from disk the constants that are used by the filtering
       algorithm */

    int handle,bytes;
    char filename[32];

    strcpy(filename,"CONST\\FILTERxx.BIN");

    if (filter_set>=0) {
       filename[12] = 'S';
       filename[13] = filter_set+48;
    }
    else {
       filename[12] = 'F';
       filename[13] = -filter_set+48;
    }

    if ((handle = open(filename,O_RDONLY|O_BINARY,S_IWRITE|S_IREAD))
          == -1) {
       cprintf("\nError opening file\n");
       finish(1);
    }

    if ((bytes = read(handle,product,PRODUCT_SIZE)) == -1) {
       cprintf("\nRead failed\n");
       finish(1);
    }

    close(handle);
}


void init_chord_constants()
```

```
{
   /* Loads from disk the constants that are used by the chord detection
      algorithm */

   int handle,bytes;
   char filename[32];

   strcpy(filename,"CONST\\CHORD.BIN");

   if ((handle = open(filename,O_RDONLY|O_BINARY,S_IWRITE|S_IREAD))
         == -1) {
      cprintf("\nError opening file\n");
      finish(1);
   }

   if ((bytes = read(handle,chord_index,CHORD_INDEX_SIZE)) == -1) {
      cprintf("\nRead failed\n");
      finish(1);
   }

   if ((bytes = read(handle,chord_name,CHORD_NAME_SIZE)) == -1) {
      cprintf("\nRead failed\n");
      finish(1);
   }

   close(handle);
}

void init_graphics()
{
   /* Initializes the graphics screen */

   int gdriver, gmode, errorcode;


   /* Set the graphics mode */

   gdriver = VGA;
   gmode = VGAHI;
   initgraph(&gdriver, &gmode, "");
   errorcode = graphresult();
   if (errorcode != grOk) {
      cprintf("\nError initializing graphics: %s\n",grapherrormsg(errorcode));
      finish(1);
   }
   graphics_initialized = TRUE;
   settextjustify(LEFT_TEXT,TOP_TEXT);


   /* Draw the signal amplitude box */

   draw_mode(panel_color);
   horz_line(324,SIGNAL_BOX_POSITION-4,SIGNAL_BOX_POSITION+35);
   horz_line(325,SIGNAL_BOX_POSITION-4,SIGNAL_BOX_POSITION+35);
   horz_line(458,SIGNAL_BOX_POSITION-4,SIGNAL_BOX_POSITION+35);
   horz_line(459,SIGNAL_BOX_POSITION-4,SIGNAL_BOX_POSITION+35);
   vert_line(SIGNAL_BOX_POSITION-4,324,459);
   vert_line(SIGNAL_BOX_POSITION-3,324,459);
   vert_line(SIGNAL_BOX_POSITION+34,324,459);
```

```
vert_line(SIGNAL_BOX_POSITION+35,324,459);

/* Draw the intonation box */

draw_mode(panel_color);
horz_line(324,INTONATION_BOX_POSITION-4,INTONATION_BOX_POSITION+11);
horz_line(325,INTONATION_BOX_POSITION-4,INTONATION_BOX_POSITION+11);
horz_line(458,INTONATION_BOX_POSITION-4,INTONATION_BOX_POSITION+11);
horz_line(459,INTONATION_BOX_POSITION-4,INTONATION_BOX_POSITION+11);
vert_line(INTONATION_BOX_POSITION-4,324,459);
vert_line(INTONATION_BOX_POSITION-3,324,459);
vert_line(INTONATION_BOX_POSITION+10,324,459);
vert_line(INTONATION_BOX_POSITION+11,324,459);

/* Draw the filter frequency box */

draw_mode(panel_color);
horz_line(324,FREQUENCY_BOX_POSITION-4,FREQUENCY_BOX_POSITION+51);
horz_line(325,FREQUENCY_BOX_POSITION-4,FREQUENCY_BOX_POSITION+51);
horz_line(458,FREQUENCY_BOX_POSITION-4,FREQUENCY_BOX_POSITION+51);
horz_line(459,FREQUENCY_BOX_POSITION-4,FREQUENCY_BOX_POSITION+51);
vert_line(FREQUENCY_BOX_POSITION-4,324,459);
vert_line(FREQUENCY_BOX_POSITION-3,324,459);
vert_line(FREQUENCY_BOX_POSITION+50,324,459);
vert_line(FREQUENCY_BOX_POSITION+51,324,459);

setcolor(panel_color);
outtextxy_dbg(FREQUENCY_BOX_POSITION+8,328,"451.3");
outtextxy_dbg(FREQUENCY_BOX_POSITION+8,336,"449.6");
outtextxy_dbg(FREQUENCY_BOX_POSITION+8,344,"448.0");
outtextxy_dbg(FREQUENCY_BOX_POSITION+8,352,"446.4");
outtextxy_dbg(FREQUENCY_BOX_POSITION+8,360,"444.8");
outtextxy_dbg(FREQUENCY_BOX_POSITION+8,368,"443.2");
outtextxy_dbg(FREQUENCY_BOX_POSITION+8,376,"441.6");
outtextxy_dbg(FREQUENCY_BOX_POSITION+8,384,"440.0");
outtextxy_dbg(FREQUENCY_BOX_POSITION+8,392,"438.4");
outtextxy_dbg(FREQUENCY_BOX_POSITION+8,400,"436.8");
outtextxy_dbg(FREQUENCY_BOX_POSITION+8,408,"435.3");
outtextxy_dbg(FREQUENCY_BOX_POSITION+8,416,"433.7");
outtextxy_dbg(FREQUENCY_BOX_POSITION+8,424,"432.1");
outtextxy_dbg(FREQUENCY_BOX_POSITION+8,432,"430.6");
outtextxy_dbg(FREQUENCY_BOX_POSITION+8,440,"429.0");
outtextxy_dbg(FREQUENCY_BOX_POSITION+8,448,"427.5");
place_filter_pointer();

/* Draw the filter response box */

draw_mode(panel_color);
horz_line(324,FILTER_BOX_POSITION-4,FILTER_BOX_POSITION+387);
horz_line(325,FILTER_BOX_POSITION-4,FILTER_BOX_POSITION+387);
horz_line(458,FILTER_BOX_POSITION-4,FILTER_BOX_POSITION+387);
horz_line(459,FILTER_BOX_POSITION-4,FILTER_BOX_POSITION+387);
vert_line(FILTER_BOX_POSITION-4,324,459);
vert_line(FILTER_BOX_POSITION-3,324,459);
vert_line(FILTER_BOX_POSITION+386,324,459);
vert_line(FILTER_BOX_POSITION+387,324,459);
```

```
void init_comport()
{
   /* Initializes the serial port and activates receiver interrupt */

   unsigned int serial_handler_off, serial_handler_seg;

   serial_handler_off = FP_OFF(serial_handler);
   serial_handler_seg = FP_SEG(serial_handler);

   asm   mov dx,3FBh;
   asm   in al,dx;
   asm   mov old_lcr,al;      // save old contents of line control register
   asm   or al,80h;
   asm   out dx,al;           // LCR set up to access baud rate

   asm   mov dx,3F8h;
   asm   in al,dx;
   asm   mov old_baud0,al;    // save old contents of baud rate divisor
   asm   mov al,02h;
   asm   out dx,al;           // baud rate divisor = 2

   asm   mov dx,3F9h;
   asm   in al,dx;
   asm   mov old_baud1,al;    // save old contents of baud rate divisor
   asm   mov al,00h;
   asm   out dx,al;           // baud rate divisor = 2

   asm   mov dx,3FBh;
   asm   mov al,03h;
   asm   out dx,al;           // set the new LCR parameters

   asm   mov dx,3F8h;
   asm   in al,dx;            // read any pending character

   asm   mov ax,350Ch;
   asm   int 21h;
   asm   mov old_handler_off,bx;
   asm   mov old_handler_seg,es;    // save old interrupt handler address
   asm   mov dx,serial_handler_off;
   asm   mov ax,serial_handler_seg;
   asm   push ds;
   asm   mov ds,ax;
   asm   mov ax,250Ch;
   asm   int 21h;             // set interrupt 0Ch to call "serial_handler"
   asm   pop ds;

   asm   cli;                 // disable all interrupts

   asm   mov dx,3FCh;
   asm   in al,dx;
   asm   mov old_mcr,al;      // save old contents of modem control register
   asm   mov al,0Fh;
   asm   out dx,al;           // enable OUT2 interrupt

   asm   mov dx,3F9h;
   asm   in al,dx;
   asm   mov old_ier,al;      // save old contents of interrupt enable register
   asm   mov al,1;
```

```
    asm   out dx,al;              // enable receiver interrupt

    asm   in al,21h;
    asm   mov old_intmask,al;  // save old interrupt mask
    asm   and al,0EFh;
    asm   out 21h,al;             // enable serial port

    asm   sti;                    // enable all interrupts

    comport_initialized = TRUE;
}


void main_loop()
{
   /* Top level program loop */

   while(TRUE) {
      get_command();
      disable_serial_port();
      clock = interrupt_counter;
      enable_serial_port();
      if (clock >= old_clock + SAMPLING_PERIOD) {
         old_clock = clock;
         update_screen();
      }
   }
}


void get_command()
{
   /* Gets and processes any pending keystroke */

   char keystroke;
   boolean valid_keystroke;
   char comment_string[4];

   if (!kbhit()) return;

   valid_keystroke = FALSE;
   keystroke = getch();

   if (edit_mode == edit_off) {
      if ((keystroke == CTRL_B) && (transcription_mode == trans_off)) {
         valid_keystroke = TRUE;
         begin_transcription();
      }
      else if (((keystroke == CTRL_E) || (keystroke == ESC)) &&
               (transcription_mode == trans_on)) {
         valid_keystroke = TRUE;
         end_transcription();
      }
      else if (keystroke == CTRL_F) {
         valid_keystroke = TRUE;
         edit_mode = filter_freq;
         setcolor(hilite_color);
         place_filter_pointer();
      }
      else if ((keystroke == CTRL_N) && (display_mode == relative))
```

```
    valid_keystroke = TRUE;
    edit_mode = noise_lev;
 }
 else if ((keystroke == CTRL_R) && (transcription_mode == trans_off))
    valid_keystroke = TRUE;
    read_chord_file();
 }
 else if ((keystroke == CTRL_W) && (transcription_mode == trans_off)) {
    valid_keystroke = TRUE;
    write_chord_file();
 }
 else if ((keystroke == CTRL_X) && (transcription_mode == trans_off)) {
    valid_keystroke = TRUE;
    finish(0);
 }
 else if (((keystroke == SPACE) || (keystroke == ENTER)) &&
          (transcription_mode == trans_on) &&
          (comment_line_number < MAX_LINES)) {
    valid_keystroke = TRUE;
    new_comment = TRUE;
    comment_column_number++;
    if (comment_column_number == MAX_COMMENTS) {
       comment_column_number = 0;
       comment_line_number++;
    }
 }
 else if ((keystroke == BACKSPACE) &&
          (transcription_mode == trans_on) &&
          ((comment_line_number > 0) || (comment_column_number > 0))) {
    valid_keystroke = TRUE;
    new_comment = FALSE;
    comment_column_number--;
    if (comment_column_number < 0) {
       comment_column_number = MAX_COMMENTS - 1;
       comment_line_number--;
    }
    comment_transcription[page_number][comment_line_number]
       [comment_column_number] = 0;
    erase_mode(all_colors);
    fill_rect(CHORD_BOX_POSITION+comment_column_number*COMMENT_WIDTH,
              comment_line_number*LINE_HEIGHT+16,
              CHORD_BOX_POSITION+comment_column_number*COMMENT_WIDTH+7,
              comment_line_number*LINE_HEIGHT+23);
}
else if ((keystroke >= 33) && (keystroke <= 126) &&
         (transcription_mode == trans_on)) {

   valid_keystroke = TRUE;
   if ((new_comment) &&
       ((comment_line_number < line_number) ||
        ((comment_line_number == line_number) &&
         (comment_column_number*COMMENT_WIDTH <
          column_number*COLUMN_WIDTH)))) {
      comment_line_number = line_number;
      comment_column_number =(column_number*COLUMN_WIDTH)/COMMENT_WIDTH;
   }
   new_comment = FALSE;

   if (comment_line_number == MAX_LINES) {
      valid_keystroke = FALSE;
```

```
            goto done;
         }

         comment_transcription[page_number][comment_line_number]
            [comment_column_number] = keystroke;
         strcpy(comment_string," ");
         comment_string[0] = keystroke;
         setcolor(comment_color);
         outtextxy_dbg(CHORD_BOX_POSITION+comment_column_number*COMMENT_WIDTH,
                       comment_line_number*LINE_HEIGHT+16,comment_string);

         comment_column_number++;
         if (comment_column_number == MAX_COMMENTS) {
            comment_column_number = 0;
            comment_line_number++;
         }
      }
   }

   else if (edit_mode == filter_freq) {
      if ((keystroke == ENTER) || (keystroke == ESC)) {
         valid_keystroke = TRUE;
         edit_mode = edit_off;
         disable_serial_port();
         init_filter_constants();
         enable_serial_port();
         setcolor(panel_color);
         place_filter_pointer();
      }
   }

   else if (edit_mode == noise_lev) {
      if ((keystroke == ENTER) || (keystroke == ESC)) {
         valid_keystroke = TRUE;
         edit_mode = edit_off;
      }
   }

   if (keystroke != 0)
      goto done;

   keystroke = getch();

   if ((edit_mode == edit_off) && (transcription_mode == trans_off)) {
      if ((keystroke == PG_UP) && (page_number > 0)) {
         valid_keystroke = TRUE;
         page_number--;
         display_page();
      }
      if ((keystroke == PG_DN) && (page_number < last_page_number)) {
         valid_keystroke = TRUE;
         page_number++;
         display_page();
      }
      if ((keystroke == HOME) && (page_number > 0)) {
         valid_keystroke = TRUE;
         page_number = 0;
         display_page();
      }
      if ((keystroke == END) && (page_number < last_page_number)) {
```

```
            valid_keystroke = TRUE;
            page_number = last_page_number;
            display_page();
         }
      }

      else if (edit_mode == filter_freq) {
         if (keystroke == UP) {
            valid_keystroke = TRUE;
            setcolor(background_color);
            place_filter_pointer();
            filter_set++;
            if (filter_set == 8)
               filter_set = -8;
            setcolor(hilite_color);
            place_filter_pointer();
         }
         else if (keystroke == DOWN) {
            valid_keystroke = TRUE;
            setcolor(background_color);
            place_filter_pointer();
            filter_set--;
            if (filter_set == -9)
               filter_set = 7;
            setcolor(hilite_color);
            place_filter_pointer();
         }
      }

      else if (edit_mode == noise_lev) {
         if ((keystroke == UP) && (noise_level < 128*FILTER_BAR_RATIO)) {
            valid_keystroke = TRUE;
            noise_level+=FILTER_BAR_RATIO;
         }
         else if ((keystroke == DOWN) && (noise_level > FILTER_BAR_RATIO)) {
            valid_keystroke = TRUE;
            noise_level-=FILTER_BAR_RATIO;
         }
      }

done:
   if (! valid_keystroke)
      beep();
}


void update_screen()
{
   /* Updates the screen display for one octave of filters */

   int display_octave;
   double temp;
   int bar_height, bar_position, bar_color;
   int i;
   int display_note, filter_note;
   int filter_abs_response, filter_rel_response;
   int filter_left_response, filter_right_response;
   boolean draw_label, erase_label;
   char note_string[4];
   long long_temp, weighted_response;
```

```
/* Determine which octave to process */

display_octave = octave[display_octave_index];
display_octave_index++;
if (display_octave_index == 32)
   display_octave_index = 0;


/* If at end of octave cycle, update intonation box and transcribe chord

if ((display_octave == -1) || (display_octave == 0)) {
   if (filter_max_left > filter_max_right) {
      temp = (filter_max_left - filter_max_right);
      if (filter_max != filter_max_right)
         temp = temp/(filter_max-filter_max_right);
      else
         temp = 0;
      temp = temp*64;
      bar_height = temp;
      if (bar_height > 64) bar_height = 64;
      erase_mode(all_colors);
      vert_bar(INTONATION_BOX_POSITI     2+bar_height,455);
      vert_bar(INTONATION_BOX_POSITION,328,391);
      draw_mode(flat_bar_color);
      vert_bar(INTONATION_BOX_POSITION,392,391+bar_height);
   }
   else {
      temp = (filter_max_right - filter_max_left);
      if (filter_max != filter_max_left)
         temp = temp/(filter_max-filter_max_left);
      else
         temp = 0;
      temp = temp*64;
      bar_height = temp;
      if (bar_height > 64) bar_height = 64;
      erase_mode(all_colors);
      vert_bar(INTONATION_BOX_POSITION,328,391-bar_height);
      vert_bar(INTONATION_BOX_POSITION,392,455);
      draw_mode(sharp_bar_color);
      vert_bar(INTONATION_BOX_POSITION,392-bar_height,391);
   }
   filter_max = 0;

   if (transcription_mode == trans_on)
      transcribe_chord();
   for (i=0;i<12;i++)
      note_family_sum[i] = 0;

   return;
}


/* Draw signal-amplitude bar for current octave */

if (signal_amplitude[display_octave] < 127) {
   bar_height = signal_amplitude[display_octave]/2;
   erase_mode(all_colors);
   vert_bar(SIGNAL_BOX_POSITION-8+display_octave*8,328,455-bar_height);
```

```
      draw_mode(panel_color);
      vert_bar(SIGNAL_BOX_POSITION-8+display_octave*8,456-bar_height,455);
   }
   else {
      bar_height = (signal_cutoff[display_octave]*64)/SAMPLING_PERIOD;
      if (bar_height > 64) bar_height = 64;
      erase_mode(all_colors);
      vert_bar(SIGNAL_BOX_POSITION-8+display_octave*8,328,391-bar_height);
      draw_mode(cutoff_bar_color);
      vert_bar(SIGNAL_BOX_POSITION-8+display_octave*8,392-bar_height,391);
      draw_mode(panel_color);
      vert_bar(SIGNAL_BOX_POSITION-8+display_octave*8,392,455);
   }

   signal_amplitude[display_octave] = 0;
   signal_cutoff[display_octave] = 0;


   /* Update the screen display for all the filters in the octave */

   for (display_note=0; display_note<12; display_note++) {

      filter_note = display_note + 1;  /* filter_note is offset because filte
                                          octaves have an extra note at eithe
                                          end */


      /* Determine the absolute and relative response of the current filter *

      filter_abs_response = peak[display_octave][filter_note];
      filter_left_response = peak[display_octave][filter_note-1];
      filter_right_response = peak[display_octave][filter_note+1];

      if (filter_left_response >= filter_right_response)
         filter_rel_response = filter_abs_response - filter_left_response;
      else
         filter_rel_response = filter_abs_response - filter_right_response;
      if (filter_rel_response < 0)
         filter_rel_response = 0;

      peak[display_octave][filter_note-1] = 0;


      /* Update filter_max if current filter has the largest response */

      if ((filter_abs_response >= filter_left_response) &&
          (filter_abs_response >= filter_right_response) &&
          (filter_abs_response > filter_max)) {
         filter_max = filter_abs_response;
         filter_max_left = filter_left_response;
         filter_max_right = filter_right_response;
      }


      /* Draw a bar to represent the filter response */

      if ((filter_rel_response >= noise_level) &&
          (filter_active[display_octave][display_note] == FALSE)) {
         filter_active[display_octave][display_note] = TRUE;
         draw_label = TRUE;
```

```
}
else
   draw_label = FALSE;

if ((filter_rel_response < noise_level) &&
    (filter_active[display_octave][display_note] == TRUE)) {
   filter_active[display_octave][display_note] = FALSE;
   erase_label = TRUE;
}
else
   erase_label = FALSE;

bar_position = FILTER_BOX_POSITION+
                  ((display_octave-1)*12+display_note)*8;

if (display_mode == absolute) {
   bar_height = filter_abs_response/FILTER_BAR_RATIO;
   if (bar_height > 128) bar_height = 128;
   bar_color = panel_color;
}

else if (display_mode == relative) {
   bar_height = filter_rel_response/FILTER_BAR_RATIO;
   if (bar_height > 128) bar_height = 128;
   if (filter_active[display_octave][display_note])
      bar_color = filter_bar_color;
   else
      bar_color = panel_color;
}

erase_mode(all_colors);
vert_bar(bar_position,328,455-bar_height);
erase_mode(15-bar_color);
vert_bar(bar_position,456-bar_height,455);
draw_mode(bar_color);
vert_bar(bar_position,456-bar_height,455);


/* Draw a segment of the noise level line (relative mode only) */

if (display_mode == relative) {
   if (filter_rel_response < noise_level) {
      if (edit_mode == noise_lev)
         draw_mode(hilite_color);
      else
         draw_mode(panel_color);
      horz_line(456-noise_level/FILTER_BAR_RATIO,bar_position,
                 bar_position+7);
   }
}


/* Label the bar with its note name */

if (draw_label == TRUE) {
   strcpy(note_string, &note_name[display_note][0]);
   setcolor(note_color);
   outtextxy_dbg(bar_position,464,note_string);
}
else if (erase_label == TRUE) {
```

```
            erase_mode(all_colors);
            vert_bar(bar_position,464,471);
            vert_bar(bar_position+8,464,471);
         }

         /* Increment the note-family sum */

         long_temp = filter_rel_response;
         weighted_response = (long_temp << (4-display_octave));
         note_family_sum[display_note] += weighted_response;
      }

      peak[display_octave][12] = 0;
      peak[display_octave][13] = 0;
   }

   void far interrupt serial_handler()
   {
      /* Interrupt handler which is invoked whenever a databyte is received
         through the serial port */

      int filter_octave;
      char input;


      /* First, save the system state */

      asm   push ax bx cx dx si di;       // save general registers
      asm   pushf;                        // save flags register


      /* Retrieve the databyte waiting at the serial port; store it in "input" *

      asm   push ds;
      asm   mov ax,DGROUP;
      asm   mov ds,ax;
      asm   mov dx,3F8h;
      asm   in al,dx;                     // get input from serial port
      asm   xor al,80h;                   // center signal at zero
      asm   mov input,al;
      asm   pop ds;


      /* Determine which octave to process */

      filter_octave = octave[filter_octave_index];
      filter_octave_index++;
      if ((filter_octave_index == 32) || (input == -128))
         filter_octave_index = 0;


      /* Skip routine if at end of octave cycle */

      if ((filter_octave == -1) || (input == -128))
         goto filter_skip;


      /* Update "signal_amplitude" if input is greater than before */
```

```
    if (input > signal_amplitude[filter_octave])
       signal_amplitude[filter_octave] = input;


    /* Increment "signal_cutoff" if input is at its limit */

    if (input == 127)
       signal_cutoff[filter_octave]++;


    /* Now update the octave of filters indicated by "filter_octave" */

    asm   mov cl,0;                  // cl = note
    asm   mov ax,filter_octave;
    asm   shl ax,1;
    asm   shl ax,1;
    asm   mov bx,ax;
    asm   shl ax,1;
    asm   add bx,ax;
    asm   shl ax,1;
    asm   add bx,ax;
    asm   mov si,bx;                 // si = octave*28+note*2

note_loop:
    asm   mov bl,input;
    asm   mov bh,cl;
    asm   shl bx,1;
    asm   mov dx,product[bx+28672];  // dx = c*input

    asm   mov ax,r2[si];
    asm   mov bl,ah;
    asm   mov bh,cl;
    asm   shl bx,1;
    asm   sub dx,product[bx+14336];  // dx = c*input - b*r2(partial)

    asm   mov bl,al;
    asm   mov bh,cl;
    asm   shl bx,1;
    asm   sub dx,product[bx+21504];  // dx = c*input - b*r2

    asm   mov ax,r1[si];
    asm   mov bl,ah;
    asm   mov bh,cl;
    asm   shl bx,1;
    asm   add dx,product[bx];        // dx = c*input - b*r2 + a*r1(partial)

    asm   mov bl,al;
    asm   mov bh,cl;
    asm   shl bx,1;
    asm   add dx,product[bx+7168];   // dx = c*input - b*r2 + a*r1

    asm   mov r0[si],dx;             // r0 = dx
    asm   mov r1[si],dx;             // r1 = r0
    asm   mov r2[si],ax;             // r2 = old r1
    asm   sub dx,ax;
    asm   mov output[si],dx;         // output = r0 - old r1

    asm   cmp dx,peak[si];
    asm   jle not_peak;
```

```
   asm   mov peak[si],dx;          // if (output > peak), peak = output

not_peak:
   asm   inc cl;
   asm   inc si;
   asm   inc si;
   asm   cmp cl,14;
   asm   jl note_loop;


   /* Increment the interrupt counter, which serves as a system clock */

filter_skip:
   interrupt_counter++;


   /* Finally, signal end-of-interrupt and restore system state */

   asm   mov al,20h;
   asm   out 20h,al;                  // signal end-of-interrupt
   asm   popf;                        // restore flags register
   asm   pop di si dx cx bx ax;       // restore general registers
}


void finish(int errorcode)
{
   /* Prepares all data structures for program termination */

   if (comport_initialized) {
      asm   cli;                   // disable all interrupts

      asm   mov al,old_intmask;
      asm   out 21h,al;            // restore interrupt mask

      asm   mov dx,3F9h;
      asm   mov al,old_ier;
      asm   out dx,al;             // restore old contents of intrpt enable reg

      asm   mov dx,3FCh;
      asm   mov al,old_mcr;
      asm   out dx,al;             // restore old contents of modem control reg

      asm   sti;                   // enable all interrupts

      asm   mov dx,old_handler_off;
      asm   mov ax,old_handler_seg;
      asm   push ds;
      asm   mov ds,ax;
      asm   mov ax,250Ch;
      asm   int 21h;               // set interrupt 0Ch to call "old_handler"
      asm   pop ds;

      asm   mov dx,3F9h;
      asm   mov al,old_baud1;
      asm   out dx,al;             // restore old contents of baud rate divisor

      asm   mov dx,3F8h;
      asm   mov al,old_baud0;
      asm   out dx,al;             // restore old contents of baud rate divisor
```

```
      asm   mov dx,3FBh;
      asm   mov al,old_lcr;
      asm   out dx,al;          // restore old contents of line control reg
   }

   if (graphics_initialized)
      closegraph();

   exit(errorcode);
}


void disable_serial_port()
{
   /* Disables the serial port interrupt */

   asm   in al,21h;
   asm   or al,010h;
   asm   out 21h,al;
}


void enable_serial_port()
{
   /* Re-enables the serial port interrupt */

   asm   in al,21h;
   asm   and al,0EFh;
   asm   out 21h,al;
}


void draw_mode(unsigned char color)
{
   /* Prepares the graphics controller to draw a particular color */

   asm   mov dx,3C4h;
   asm   mov ah,color;          // set the color
   asm   mov al,2;
   asm   out dx,ax;
   asm   mov dx,3CEh;
   asm   mov ah,16;             // 16 = draw mode
   asm   mov al,3;
   asm   out dx,ax;

   gfx_mode = draw;
}


void erase_mode(unsigned char color)
{
   /* Prepares the graphics controller to erase a particular color */

   asm   mov dx,3C4h;
   asm   mov ah,color;          // set the color
   asm   mov al,2;
   asm   out dx,ax;
   asm   mov dx,3CEh;
   asm   mov ah,8;              // 8 = erase mode
```

```
    asm   mov al,3;
    asm   out dx,ax;

    gfx_mode = erase;
}

void horz_line(int y, int x1, int x2)
{
    /* Places a horizontal line on the graphics screen */

    unsigned int scrn_y, scrn_x1, scrn_x2;
    unsigned char endpiece1, endpiece2;

    asm   mov ax,x1;
    asm   shr ax,1;
    asm   shr ax,1;
    asm   shr ax,1;
    asm   mov scrn_x1,ax;         // scrn_x1 = x1/8
    asm   shl ax,1;
    asm   shl ax,1;
    asm   shl ax,1;
    asm   mov bx,x1;
    asm   sub bx,ax;
    asm   mov cl,bl;
    asm   mov ah,0FFh;
    asm   shr ah,cl;
    asm   mov endpiece1,ah;

    asm   mov ax,x2;
    asm   shr ax,1;
    asm   shr ax,1;
    asm   shr ax,1;
    asm   mov scrn_x2,ax;         // scrn_x2 = x2/8
    asm   shl ax,1;
    asm   shl ax,1;
    asm   shl ax,1;
    asm   mov bx,x2;
    asm   sub bx,ax;
    asm   inc bx;
    asm   mov cl,bl;
    asm   mov ah,0FFh;
    asm   shr ah,cl;
    asm   xor ah,0FFh;
    asm   mov endpiece2,ah;

    asm   mov bx,scrn_x1;
    asm   cmp bx,scrn_x2;
    asm   jne and_skip;
    asm   and ah,endpiece1;
    asm   mov endpiece1,ah;
    asm   mov endpiece2,ah;
and_skip:

    asm   mov ax,y;
    asm   mov bx,ax;
    asm   shl ax,1;
    asm   shl ax,1;
    asm   add bx,ax;
    asm   add bx,gfx_scrnbase;
```

```
    asm   mov scrn_y,bx;          // scrn_y = y*5 + gfx_scrnbase

    if (gfx_mode == draw)
       asm   mov ah,255;
    else
       asm   mov ah,0;

    asm   mov es,scrn_y;
    asm   mov bx,scrn_x1;

    asm   jmp line_start;
 line_loop:
    asm   mov byte ptr es:[bx],ah;
 line_start:
    asm   inc bx;
    asm   cmp bx,scrn_x2;
    asm   jb line_loop;

    if (gfx_mode == draw) {
       asm   mov ah,endpiece1;
       asm   mov bx,scrn_x1;
       asm   or byte ptr es:[bx],ah;
       asm   mov ah,endpiece2;
       asm   mov bx,scrn_x2;
       asm   or byte ptr es:[bx],ah;
    }
    else {
       asm   mov ah,endpiece1;
       asm   xor ah,255;
       asm   mov bx,scrn_x1;
       asm   and byte ptr es:[bx],ah;
       asm   mov ah,endpiece2;
       asm   xor ah,255;
       asm   mov bx,scrn_x2;
       asm   and byte ptr es:[bx],ah;
    }
}


void vert_line(int x, int y1, int y2)
{
   /* Places a vertical line on the graphics screen */

   unsigned int scrn_x, scrn_y1, scrn_y2;
   unsigned char bitpiece;

   asm   mov ax,x;
   asm   shr ax,1;
   asm   shr ax,1;
   asm   shr ax,1;
   asm   mov scrn_x,ax;          // scrn_x = x/8
   asm   shl ax,1;
   asm   shl ax,1;
   asm   shl ax,1;
   asm   mov bx,x;
   asm   sub bx,ax;
   asm   mov cl,bl;
   asm   mov ah,80h
   asm   shr ah,cl;
   asm   mov bitpiece,ah;
```

```
    asm   mov ax,y1;
    asm   mov bx,ax;
    asm   shl ax,1;
    asm   shl ax,1;
    asm   add bx,ax;
    asm   add bx,gfx_scrnbase;
    asm   mov scrn_y1,bx;          // scrn_y1 = y1*5 + gfx_scrnbase

    asm   mov ax,y2;
    asm   mov bx,ax;
    asm   shl ax,1;
    asm   shl ax,1;
    asm   add bx,ax;
    asm   add bx,gfx_scrnbase;
    asm   mov scrn_y2,bx;          // scrn_y2 = y2*5 + gfx_scrnbase

    if (gfx_mode == draw) {
       asm   mov ah,bitpiece;
       asm   mov cx,scrn_y1;
       asm   mov es,cx;
       asm   mov bx,scrn_x;
       asm   jmp line_start1;
    line_loop1:
       asm   or byte ptr es:[bx],ah;
       asm   add cx,5;
       asm   mov es,cx;
    line_start1:
       asm   cmp cx,scrn_y2;
       asm   jbe line_loop1;
    }

    else {
       asm   mov ah,bitpiece;
       asm   xor ah,255;
       asm   mov cx,scrn_y1;
       asm   mov es,cx;
       asm   mov bx,scrn_x;
       asm   jmp line_start2;
    line_loop2:
       asm   and byte ptr es:[bx],ah;
       asm   add cx,5;
       asm   mov es,cx;
    line_start2:
       asm   cmp cx,scrn_y2;
       asm   jbe line_loop2;
    }
}


void vert_bar(int x, int y1, int y2)
{
   /* Places a vertical bar on the graphics screen */

   unsigned int scrn_x, scrn_y1, scrn_y2;

   asm   mov ax,x;
   asm   shr ax,1;
   asm   shr ax,1;
   asm   shr ax,1;
```

```
    asm   mov scrn_x,ax;          // scrn_x = x/8

    asm   mov ax,y1;
    asm   mov bx,ax;
    asm   shl ax,1;
    asm   shl ax,1;
    asm   add bx,ax;
    asm   add bx,gfx_scrnbase;
    asm   mov scrn_y1,bx;         // scrn_y1 = y1*5 + gfx_scrnbase

    asm   mov ax,y2;
    asm   mov bx,ax;
    asm   shl ax,1;
    asm   shl ax,1;
    asm   add bx,ax;
    asm   add bx,gfx_scrnbase;
    asm   mov scrn_y2,bx;         // scrn_y2 = y2*5 + gfx_scrnbase

    if (gfx_mode == draw)
       asm   mov ah,255;
    else
       asm   mov ah,0;

    asm   mov cx,scrn_y1;
    asm   mov es,cx;
    asm   mov bx,scrn_x;

    asm   jmp bar_start;
bar_loop:
    asm   mov byte ptr es:[bx],ah;
    asm   add cx,5;
    asm   mov es,cx;
bar_start:
    asm   cmp cx,scrn_y2;
    asm   jbe bar_loop;
}


void fill_rect(int x1, int y1, int x2, int y2)
{
    /* Fills a rectangular region of the graphics screen */

    unsigned int scrn_x1, scrn_x2, scrn_y1, scrn_y2;

    asm   mov ax,x1;
    asm   shr ax,1;
    asm   shr ax,1;
    asm   shr ax,1;
    asm   mov scrn_x1,ax;         // scrn_x1 = x1/8

    asm   mov ax,x2;
    asm   shr ax,1;
    asm   shr ax,1;
    asm   shr ax,1;
    asm   mov scrn_x2,ax;         // scrn_x2 = x2/8

    asm   mov ax,y1;
    asm   mov bx,ax;
    asm   shl ax,1;
    asm   shl ax,1;
```

```
    asm   add bx,ax;
    asm   add bx,gfx_scrnbase;
    asm   mov scrn_y1,bx;          // scrn_y1 = y1*5 + gfx_scrnbase

    asm   mov ax,y2;
    asm   mov bx,ax;
    asm   shl ax,1;
    asm   shl ax,1;
    asm   add bx,ax;
    asm   add bx,gfx_scrnbase;
    asm   mov scrn_y2,bx;          // scrn_y2 = y2*5 + gfx_scrnbase

    if (gfx_mode == draw)
       asm   mov ah,255;
    else
       asm   mov ah,0;

    asm   mov cx,scrn_y1;
    asm   mov es,cx;
    asm   mov bx,scrn_x1;

 fill_loop:
    asm   mov byte ptr es:[bx],ah;
    asm   inc bx;
    asm   cmp bx,scrn_x2;
    asm   jbe fill_loop;
    asm   mov bx,scrn_x1;
    asm   add cx,5;
    asm   mov es,cx;
    asm   cmp cx,scrn_y2;
    asm   jbe fill_loop;
 }


void outtextxy_dbg(int x, int y, char *textstring)
{
   /* Does what "outtextxy()" should do */

   outtextxy(0,0," ");
   outtextxy(x,y,textstring);
   outtextxy(0,0," ");
}


void beep()
{
   /* Beeps */

   sound(1000);
   delay(10);
   nosound();
   fix_delay();
}


void fix_delay()
{
   /* Resets signal monitors, which become skewed by delays */

   int i;
```

```
      for (i=0;i<5;i++) {
         signal_amplitude[i] = 0;
         signal_cutoff[i] = 0;
      }
   }


   void place_filter_pointer()
   {
      /* Places an arrow on the graphics screen pointing to the current filte
         frequency */

      char arrow_string[4];

      strcpy(arrow_string," ");
      arrow_string[0] = RIGHT_ARROW;
      outtextxy_dbg(FREQUENCY_BOX_POSITION,384-filter_set*8,arrow_string);
   }


   void begin_transcription()
   {
      /* Begins a transcription */

      int i,j,k;

      transcription_mode = trans_on;
      page_number = 0;
      line_number = 0;
      column_number = 0;
      comment_line_number = 0;
      comment_column_number = 0;
      new_comment = TRUE;

      for (i=0;i<MAX_PAGES;i++) {
         for (j=0;j<MAX_LINES;j++) {
            for (k=0;k<MAX_COLUMNS;k++)
               chord_transcription[i][j][k] = NO_CHORD;
            for (k=0;k<MAX_COMMENTS;k++)
               comment_transcription[i][j][k] = 0;
         }
      }

      strcpy(title,"");

      fix_delay();
   }


   void end_transcription()
   {
      /* Terminates a transcription */

      transcription_mode = trans_off;
      last_page_number = page_number;
      display_page();
   }
```

```
void transcribe_chord()
{
   /* Displays the name of the chord currently being played */

   char trans_msg[16];
   int i,j;
   boolean note_on[12];
   long max_sum;
   int max_j;
   int chord_structure[3];
   unsigned int chord_structure_word;
   unsigned char current_chord_index;
   unsigned char current_chord_family, current_chord_type;

   if ((line_number == 0) && (column_number == 0)) {
      new_page();
      strcpy(trans_msg,"Transcribing");
      setcolor(message_color);
      outtextxy_dbg(544,0,trans_msg);
      fix_delay();

      comment_column_number = 0;
      comment_line_number = 0;
      new_comment = TRUE;
   }

   for (i=0;i<12;i++)
      note_on[i] = FALSE;

   for (i=0;i<3;i++) {
      max_sum = 0;
      max_j = -1;

      for (j=0;j<12;j++) {
         if ((note_family_sum[j] > max_sum) &&
              (note_on[j] == FALSE)) {
            max_sum = note_family_sum[j];
            max_j = j;
         }
      }

      chord_structure[i] = max_j;
      note_on[max_j] = TRUE;
   }

   chord_structure_word = 0;

   for (i=0;i<3;i++) {
      if (chord_structure[i] != -1)
         chord_structure_word += (1 << chord_structure[i]);
   }

   current_chord_index = chord_index[chord_structure_word];
   current_chord_family = (current_chord_index >> 4);
   current_chord_type = (current_chord_index & 15);

   chord_transcription[page_number][line_number][column_number] =
      current_chord_index;

   draw_mode(chord_color[current_chord_family]);
```

```
    for (i=0;i<COLUMN_WIDTH;i++) {
       if (current_chord_type == 0)
          vert_line((CHORD_BOX_POSITION+column_number*COLUMN_WIDTH+i),
                    (line_number*LINE_HEIGHT+
                       chord_height[current_chord_family]),
                    (line_number*LINE_HEIGHT+
                       chord_height[current_chord_family]+6));
       else if (current_chord_type == 1)
          vert_line((CHORD_BOX_POSITION+column_number*COLUMN_WIDTH+i),
                    (line_number*LINE_HEIGHT+
                       chord_height[current_chord_family]+2),
                    (line_number*LINE_HEIGHT+
                       chord_height[current_chord_family]+4));
    }

    column_number++;
    if (column_number >= MAX_COLUMNS) {
       column_number = 0;
       line_number++;
       if (line_number >= MAX_LINES) {
          line_number = 0;
          page_number++;
          if (page_number >= MAX_PAGES) {
             page_number = MAX_PAGES-1;
             end_transcription();
          }
       }
    }
}

void display_page()
{
   /* Displays a page of transcribed music */

   unsigned char current_chord_index;
   unsigned char current_chord_family, current_chord_type;
   int i;
   char comment_string[4];

   new_page();

   for (line_number=0; line_number<MAX_LINES; line_number++) {
      for (column_number=0; column_number<MAX_COLUMNS; column_number++) {

         current_chord_index = chord_transcription[page_number][line_number]
                                                  [column_number];
         current_chord_family = (current_chord_index >> 4);
         current_chord_type = (current_chord_index & 15);

         draw_mode(chord_color[current_chord_family]);
         for (i=0;i<COLUMN_WIDTH;i++) {
            if (current_chord_type == 0)
               vert_line((CHORD_BOX_POSITION+column_number*COLUMN_WIDTH+i),
                         (line_number*LINE_HEIGHT+
                            chord_height[current_chord_family]),
                         (line_number*LINE_HEIGHT+
                            chord_height[current_chord_family]+6));
            else if (current_chord_type == 1)
               vert_line((CHORD_BOX_POSITION+column_number*COLUMN_WIDTH+i),
```

```
                              (line_number*LINE_HEIGHT+
                                 chord_height[current_chord_family]+2),
                              (line_number*LINE_HEIGHT+
                                 chord_height[current_chord_family]+4));
            }
         }
      }

      for (comment_line_number=0; comment_line_number<MAX_LINES;
            comment_line_number++) {
         for (comment_column_number=0; comment_column_number<MAX_COMMENTS;
               comment_column_number++) {
            if (comment_transcription[page_number][comment_line_number]
                                      [comment_column_number] != 0) {
               strcpy(comment_string," ");
               comment_string[0] = comment_transcription[page_number]
                  [comment_line_number][comment_column_number];
               setcolor(comment_color);
               outtextxy_dbg(CHORD_BOX_POSITION+
                                 comment_column_number*COMMENT_WIDTH,
                              comment_line_number*LINE_HEIGHT+16,comment_string)
            }
         }
      }

      fix_delay();
   }

   void new_page()
   {
      /* Draws a blank page */

      char page_string[8];
      char chord_string[4];
      int i,j;

      erase_mode(all_colors);
      fill_rect(0,0,639,319);

      setcolor(hilite_color);
      outtextxy_dbg(0,0,title);

      strcpy(page_string,"----");
      page_string[1] = (page_number+1)/10 + 48;
      page_string[2] = (page_number+1)%10 + 48;
      if (page_string[1] == '0') {
         page_string[0] = ' ';
         page_string[1] = '-';
      }
      setcolor(page_color);
      outtextxy_dbg(304,0,page_string);

      for (i=0;i<MAX_LINES;i++) {
         for (j=0;j<12;j++) {
            strcpy(chord_string, &note_name[j][0]);
            setcolor(chord_color[j]);
            outtextxy_dbg((CHORD_BOX_POSITION-8*strlen(chord_string)),
                           (i*LINE_HEIGHT+chord_height[j]),
                           chord_string);
```

```
            }
        }
    }

void read_chord_file()
{
    /* Reads from disk a transcribed progression of chords */

    int handle,bytes;
    char pathname[32], filename[16];
    int errorcode;
    int i,j;
    unsigned char chord_buffer[MAX_LINES][MAX_COLUMNS];
    char comment_buffer[MAX_LINES][MAX_COMMENTS];
    char keystroke;

    strcpy(pathname,"FILES\\");
    errorcode = 0;

    erase_mode(all_colors);
    fill_rect(0,0,639,319);
    setcolor(message_color);
    outtextxy_dbg(200,128,"File to read:");
    setcolor(hilite_color);
    get_string(320,128,filename);
    if (strcmpi(filename,"") == 0)
        goto done;
    strcat(pathname, filename);
    if ((handle = open(pathname,O_RDONLY|O_BINARY,S_IWRITE|S_IREAD)) == -1)
        goto error;

    errorcode = 1;

    if ((bytes = read(handle,&last_page_number,sizeof last_page_number)) == -1)
        goto error;

    if ((last_page_number < 0) || (last_page_number >= MAX_PAGES))
        goto error;

    for (i=0;i<=last_page_number;i++) {
        if ((bytes = read(handle,chord_buffer,MAX_LINES*MAX_COLUMNS)) == -1)
            goto error;
        movedata(FP_SEG(chord_buffer),
                 FP_OFF(chord_buffer),
                 FP_SEG(&chord_transcription[i][0][0]),
                 FP_OFF(&chord_transcription[i][0][0]),
                 MAX_LINES*MAX_COLUMNS);

        if ((bytes = read(handle,comment_buffer,MAX_LINES*MAX_COMMENTS)) == -1)
            goto error;
        movedata(FP_SEG(comment_buffer),
                 FP_OFF(comment_buffer),
                 FP_SEG(&comment_transcription[i][0][0]),
                 FP_OFF(&comment_transcription[i][0][0]),
                 MAX_LINES*MAX_COMMENTS);
    }

    close(handle);
    page_number = 0;
```

```
   strcpy(title,strupr(filename));

done:
   display_page();
   return;

error:
   close(handle);
   erase_mode(all_colors);
   fill_rect(0,128,639,135);
   setcolor(message_color);
   if (errorcode == 0)
     outtextxy_dbg(128,128,"Error opening file.  Press any key to continue.")
   else if (errorcode == 1)
      outtextxy_dbg(160,128,"Read failed.  Press any key to continue.");
   beep();
   while (!kbhit());
   keystroke = getch();
   if (keystroke == 0)
      getch();
   page_number = 0;
   last_page_number = 0;
   for (i=0;i<MAX_LINES;i++) {
      for (j=0;j<MAX_COLUMNS;j++)
         chord_transcription[0][i][j] = NO_CHORD;
      for (j=0;j<MAX_COMMENTS;j++)
         comment_transcription[0][i][j] = 0;
   }
   strcpy(title,"");
   display_page();
}


void write_chord_file()
{
   /* Writes to disk a transcribed progression of chords */

   int handle,bytes;
   char pathname[32], filename[16];
   int errorcode;
   int i;
   unsigned char chord_buffer[MAX_LINES][MAX_COLUMNS];
   char comment_buffer[MAX_LINES][MAX_COMMENTS];
   char keystroke;

   strcpy(pathname,"FILES\\");
   errorcode = 0;

   erase_mode(all_colors);
   fill_rect(0,0,639,319);
   setcolor(message_color);
   outtextxy_dbg(192,128,"File to write:");
   setcolor(hilite_color);
   get_string(320,128,filename);
   if (strcmpi(filename,"") == 0)
      goto done;
   strcat(pathname, filename);
   if ((handle = open(pathname,O_WRONLY|O_CREAT|O_TRUNC|O_BINARY,
         S_IWRITE|S_IREAD)) == -1)
      goto error;
```

```
    errorcode = 1;

    if ((bytes = write(handle,&last_page_number,sizeof last_page_number)) ==-1
       goto error;

    for (i=0;i<=last_page_number;i++) {
       movedata(FP_SEG(&chord_transcription[i][0][0]),
                FP_OFF(&chord_transcription[i][0][0]),
                FP_SEG(chord_buffer),
                FP_OFF(chord_buffer),
                MAX_LINES*MAX_COLUMNS);
       if ((bytes = write(handle,chord_buffer,MAX_LINES*MAX_COLUMNS)) == -1)
          goto error;

       movedata(FP_SEG(&comment_transcription[i][0][0]),
                FP_OFF(&comment_transcription[i][0][0]),
                FP_SEG(comment_buffer),
                FP_OFF(comment_buffer),
                MAX_LINES*MAX_COMMENTS);
       if ((bytes = write(handle,comment_buffer,MAX_LINES*MAX_COMMENTS)) == -1
          goto error;
    }

    close(handle);
    strcpy(title,strupr(filename));

done:
    display_page();
    return;

error:
    close(handle);
    erase_mode(all_colors);
    fill_rect(0,128,639,135);
    setcolor(message_color);
    if (errorcode == 0)
      outtextxy_dbg(128,128,"Error opening file.  Press any key to continue.");
    else if (errorcode == 1)
       outtextxy_dbg(152,128,"Write failed.  Press any key to continue.");
    beep();
    while (!kbhit());
    keystroke = getch();
    if (keystroke == 0)
       getch();
    display_page();
}


void get_string(int x, int y, char *str)
{
   /* Gets a string from the user on the graphics screen */

   char edit_str[16];
   int i;
   char keystroke;

   strcpy(edit_str,"               ");
   i = 0;
```

```
      while(TRUE) {
         while (!kbhit());
         keystroke = getch();
         if (keystroke == 0)
            getch();
         if ((keystroke >= 33) && (keystroke <= 126) && (i < 12)) {
            edit_str[i] = keystroke;
            i++;
            outtextxy_dbg(x,y,edit_str);
         }
         else if ((keystroke == BACKSPACE) && (i > 0)) {
            i--;
            edit_str[i] = ' ';
            erase_mode(all_colors);
            fill_rect(x+i*8,y,x+i*8+7,y+7);
         }
         else if (keystroke == ESC) {
            strcpy(str,"");
            return;
         }
         else if (keystroke == ENTER) {
            strcpy(str,edit_str);
            return;
         }
         else {
            beep();
         }
      }
   }
```

```
/* MKFILTER.CPP:  Generates the files containing the filter constants used b
                  SCRIPT.CPP */

#include <fcntl.h>
#include <io.h>
#include <math.h>
#include <stdlib.h>
#include <stdio.h>
#include <sys\stat.h>

#define PI 3.141592654
#define TWO_PI 6.283185308
#define MAX_FILTER_FREQ 523.2511306
#define SAMPLING_FREQ 4800.0
#define Q 40.0


int AH_PRODUCT[14][256], AL_PRODUCT[14][256];
int BH_PRODUCT[14][256], BL_PRODUCT[14][256];
int C_PRODUCT[14][256];


long round(double d);


main()
{
   double F,A,B,C,factor,j_double,k_double;
   int i,j,k;
   int handle,bytes;
   char *filename = "CONST\\FILTERxx.BIN";

   for (k=-8;k<8;k++) {
      k_double = k;
      for (j=0;j<14;j++) {
         j_double = j-1;
         F = pow(2.0,((j_double/12.0)+(k_double/192.0)))
            *MAX_FILTER_FREQ/SAMPLING_FREQ;
         A = 2.0*cos(TWO_PI*F)*exp(-PI*F/Q);
         B = exp(-TWO_PI*F/Q);
         C = cos(PI*F)*sqrt(1.0-A+B)/Q;

         for (i=0;i<256;i++) {
            if (i<128)
               factor = 256*i;
            else
               factor = 256*(i-256);
            AH_PRODUCT[j][i] = round(factor*A);
            BH_PRODUCT[j][i] = round(factor*B);
            factor = i;
            AL_PRODUCT[j][i] = round(factor*A);
            BL_PRODUCT[j][i] = round(factor*B);
            if (i<128)
               factor = 128*i;
            else
               factor = 128*(i-256);
            C_PRODUCT[j][i] = round(factor*C);
         }
      }
```

```
        if (k>=0) {
           filename[12] = 'S';
           filename[13] = k+48;
        }
        else {
           filename[12] = 'F';
           filename[13] = -k+48;
        }

        if ((handle = open(filename,O_CREAT|O_WRONLY|O_BINARY,
              S_IWRITE|S_IREAD)) == -1) {
           printf("Error opening file\n");
           exit(1);
        }
        if ((bytes = write(handle,AH_PRODUCT,7168)) == -1) {
           printf("Write failed\n");
           exit(1);
        }
        if ((bytes = write(handle,AL_PRODUCT,7168)) == -1) {
           printf("Write failed\n");
           exit(1);
        }
        if ((bytes = write(handle,BH_PRODUCT,7168)) == -1) {
           printf("Write failed\n");
           exit(1);
        }
        if ((bytes = write(handle,BL_PRODUCT,7168)) == -1) {
           printf("Write failed\n");
           exit(1);
        }
        if ((bytes = write(handle,C_PRODUCT,7168)) == -1) {
           printf("Write failed\n");
           exit(1);
        }
        close(handle);
     }
  }

  long round(double d)
  {
     long l;
     char sign;

     if (d>=0) sign = 1; else sign = -1;
     d = d*sign;
     d = d+0.5;
     l = d;
     l = l*sign;
     return l;
  }
```

```
/* MKCHORD.CPP:  Generates the file containing the chord constants used b
                 SCRIPT.CPP */

#pragma inline

#include <fcntl.h>
#include <io.h>
#include <stdlib.h>
#include <stdio.h>
#include <string.h>
#include <sys\stat.h>

#define NO_CHORD 255
#define MAJ 0
#define MIN 1
#define SUS 2
#define DOM7 3
#define MAJ7 4
#define M6 5
#define M7 6
#define SUS7 7


unsigned char chord_index[4096];
char chord_name[16][16][8];


void index_chord(unsigned char index, unsigned int structure);


main()
{
   int i,j;
   int handle,bytes;
   char *filename = "CONST\\CHORD.BIN";

   for (i=0;i<4096;i++)
      chord_index[i] = NO_CHORD;

   for (i=0;i<16;i++)
      for (j=0;j<16;j++)
         strcpy(chord_name[i][j],"");

   index_chord(MAJ, 0x091); // 0000 1001 0001b
   index_chord(MIN, 0x089); // 0000 1000 1001b
// index_chord(SUS, 0x0A1); // 0000 1010 0001b
   index_chord(DOM7,0x491); // 0100 1001 0001b
   index_chord(MAJ7,0x891); // 1000 1001 0001b
   index_chord(M6,  0x289); // 0010 1000 1001b
   index_chord(M7,  0x489); // 0100 1000 1001b
   index_chord(SUS7,0x4A1); // 0100 1010 0001b

   for (i=0;i<12;i++) {
      for (j=0;j<16;j++) {
         if (i==0) strcpy(chord_name[i][j],"C");
         else if (i==1) strcpy(chord_name[i][j],"C#");
         else if (i==2) strcpy(chord_name[i][j],"D");
         else if (i==3) strcpy(chord_name[i][j],"D#");
         else if (i==4) strcpy(chord_name[i][j],"E");
         else if (i==5) strcpy(chord_name[i][j],"F");
```

```
            else if (i==6) strcpy(chord_name[i][j],"F#");
            else if (i==7) strcpy(chord_name[i][j],"G");
            else if (i==8) strcpy(chord_name[i][j],"G#");
            else if (i==9) strcpy(chord_name[i][j],"A");
            else if (i==10) strcpy(chord_name[i][j],"A#");
            else if (i==11) strcpy(chord_name[i][j],"B");

            if (j==MAJ) strcat(chord_name[i][j],"");
            else if (j==MIN) strcat(chord_name[i][j],"m");
//          else if (j==SUS) strcat(chord_name[i][j],"sus");
            else if (j==DOM7) strcat(chord_name[i][j],"7");
            else if (j==MAJ7) strcat(chord_name[i][j],"maj7");
            else if (j==M6) strcat(chord_name[i][j],"m6");
            else if (j==M7) strcat(chord_name[i][j],"m7");
            else if (j==SUS7) strcat(chord_name[i][j],"7sus");
         }
      }

      strcpy(chord_name[15][15],"---");

      if ((handle = open(filename,O_CREAT|O_WRONLY|O_BINARY,
            S_IWRITE|S_IREAD)) == -1) {
         printf("Error opening file\n");
         exit(1);
      }
      if ((bytes = write(handle,chord_index,4096)) == -1) {
         printf("Write failed\n");
         exit(1);
      }
      if ((bytes = write(handle,chord_name,2048)) == -1) {
         printf("Write failed\n");
         exit(1);
      }
      close(handle);
}

void index_chord(unsigned char index, unsigned int structure)
{
      asm   mov al,index;
      asm   mov bx,structure;

chord_loop:
      asm   mov byte ptr chord_index[bx],al;
      asm   shl bx,1;
      asm   cmp bx,0001000000000000b;
      asm   jb cycle_skip;
      asm   and bx,0000111111111111b;
      asm   inc bx;
cycle_skip:
      asm   add al,16;
      asm   cmp al,0C0h;
      asm   jb chord_loop;
}
```